US010938608B2

(12) United States Patent
Yoshizawa

(10) Patent No.: US 10,938,608 B2
(45) Date of Patent: Mar. 2, 2021

(54) APPARATUS AND METHOD

(71) Applicant: SONY CORPORATION, Tokyo (JP)

(72) Inventor: Atsushi Yoshizawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/773,426

(22) PCT Filed: Aug. 9, 2016

(86) PCT No.: PCT/JP2016/073499
§ 371 (c)(1),
(2) Date: May 3, 2018

(87) PCT Pub. No.: WO2017/085971
PCT Pub. Date: May 26, 2017

(65) Prior Publication Data
US 2018/0331869 A1 Nov. 15, 2018

(30) Foreign Application Priority Data
Nov. 19, 2015 (JP) .............................. JP2015-226893

(51) Int. Cl.
H04L 27/26 (2006.01)
H04L 25/03 (2006.01)
(Continued)

(52) U.S. Cl.
CPC ............ *H04L 27/26* (2013.01); *H04L 5/0007* (2013.01); *H04L 25/03834* (2013.01);
(Continued)

(58) Field of Classification Search
CPC ............... H04J 11/0023; H04J 11/2011; H04J 11/0016; H04J 2011/0016; H04L 1/004;
(Continued)

(56) References Cited

U.S. PATENT DOCUMENTS 9,503,297 B2 * 11/2016 Asjadi ................. H04L 27/2611
2005/0212661 A1 * 9/2005 Friedrich ............. G06K 7/0008
340/10.5
(Continued)

FOREIGN PATENT DOCUMENTS

CN 104854801 A 8/2015
CN 105009490 A 10/2015
(Continued)

OTHER PUBLICATIONS

Tiwari, et al., "Precoded Generalised Frequency Division Multiplexing System to Combat Inter-Carrier Interference: Performance Analysis", The Institution of Engineering and Technology, 2015, ISSN 1751-8628, vol. 9, Issue 15, pp. 1829-1841.
(Continued)

Primary Examiner — Asad M Nawaz
Assistant Examiner — Kai Chang
(74) Attorney, Agent, or Firm — Chip Law Group

(57) ABSTRACT

Provided is an apparatus including a processing unit to perform filtering on data of a predetermined value and transmission data for every predetermined number of subcarriers, the data of the predetermined value being mapped to a subsymbol of an end portion in a time direction in a unit resource including one or more subcarriers and multiple subsymbols, the transmission data being mapped to another subsymbol in the unit resource.

13 Claims, 18 Drawing Sheets

(51) Int. Cl.
*H04L 5/00* (2006.01)
*H04J 11/00* (2006.01)
*H04L 1/00* (2006.01)

(52) U.S. Cl.
CPC ...... *H04L 27/2602* (2013.01); *H04L 27/2697* (2013.01); *H04J 11/0023* (2013.01); *H04J 2011/0016* (2013.01); *H04L 1/004* (2013.01)

(58) Field of Classification Search
CPC . H04L 5/0007; H04L 25/03834; H04L 27/26; H04L 27/2602; H04L 27/2697
See application file for complete search history.

(56) References Cited

U.S. PATENT DOCUMENTS

| | | | | |
|---|---|---|---|---|
| 2009/0285193 | A1* | 11/2009 | Kim | H04L 5/0007 370/342 |
| 2009/0316806 | A1* | 12/2009 | Cheng | H04L 5/0007 375/260 |
| 2010/0085866 | A1* | 4/2010 | Li | H04L 25/0204 370/208 |
| 2010/0189132 | A1 | 7/2010 | Fettweis et al. | |
| 2011/0064032 | A1* | 3/2011 | Sun | H04L 5/0007 370/328 |
| 2011/0255519 | A1* | 10/2011 | Tamaki | H04L 1/004 370/335 |
| 2014/0355626 | A1* | 12/2014 | Fechtel | H04L 27/2605 370/474 |
| 2015/0010096 | A1* | 1/2015 | Kim | H04L 5/0053 375/260 |
| 2015/0264683 | A1 | 9/2015 | Kim et al. | |
| 2016/0036615 | A1 | 2/2016 | Hasegawa et al. | |
| 2016/0254889 | A1* | 9/2016 | Shattil | H04W 52/42 370/329 |
| 2016/0294521 | A1* | 10/2016 | Au | H04L 5/0007 |
| 2017/0034824 | A1* | 2/2017 | Liu | H04L 5/0082 |
| 2017/0070377 | A1* | 3/2017 | Sawahashi | H04L 27/2602 |
| 2017/0099172 | A1* | 4/2017 | Ren | H04L 25/0202 |
| 2017/0187392 | A1* | 6/2017 | Ikegaya | H03M 13/1185 |
| 2017/0331609 | A1* | 11/2017 | Xia | H04L 5/0051 |
| 2018/0083749 | A1* | 3/2018 | Lee | H04L 5/0007 |
| 2018/0270093 | A1* | 9/2018 | Lopez | H04J 11/00 |

FOREIGN PATENT DOCUMENTS

| | | |
|---|---|---|
| EP | 2911320 A1 | 8/2015 |
| EP | 2975790 A1 | 1/2016 |
| JP | 2016-500964 A | 1/2016 |
| JP | 5952487 B2 | 7/2016 |
| KR | 10-2015-0091046 A | 8/2015 |
| WO | 2014/065563 A1 | 5/2014 |
| WO | 2014/142082 A1 | 9/2014 |
| WO | 2015/143991 A1 | 10/2015 |

OTHER PUBLICATIONS

Michailow, et al., "Generalized Frequency Division Multiplexing for 5th Generation Cellular Networks", IEEE Transactions on Communications, vol. 62, Issue 9, Sep. 2014, pp. 3045-3061.

Tiwari, et al., "Precoded Generalised Frequency Division Multiplexing System to Combat Inter-carrier Interference: Performance Analysis", IET Communications, vol. 9, Issue 15, 2015, pp. 1829-1841.

Tiwari, et al., "Precoded generalised frequency division multiplexing system to combat inter-carrier interference: performance analysis", IET Communications, vol. 9, Issue 15, Oct. 15, 2015, pp. 1829-1841.

International Search Report and Written Opinion of PCT Application No. PCT/JP2016/073499, dated Sep. 13, 2016, 08 pages of ISRWO.

Michailow, et al., "Generalized Frequency Division Multiplexing for 5th Generation Cellular Networks", IEEE, Transactions on Communications, vol. 62, No. 9, Sep. 2014, pp. 3045-3061.

Office Action for JP Patent Application No. 2017-551550, dated Sep. 15, 2020, 04 pages of Office Action and 05 pages of English Translation.

\* cited by examiner

FREQUENCY
TIME

APPARATUS AND METHOD

CROSS REFERENCE TO RELATED APPLICATIONS

This application is a U.S. National Phase of International Patent Application No. PCT/JP2016/073499 filed on Aug. 9, 2016, which claims priority benefit of Japanese Patent Application No. JP 2015-226893 filed in the Japan Patent Office on Nov. 19, 2015. Each of the above-referenced applications is hereby incorporated herein by reference in its entirety.

TECHNICAL FIELD

The present disclosure relates to an apparatus, a method, and a program.

BACKGROUND ART

In recent years, as a representative of multicarrier modulation techniques (that is, multiplexing techniques or multiple access technologies), orthogonal frequency division multiplexing (OFDM) and orthogonal frequency division multiple access (OFDMA) have been put to practical use in various wireless systems. Application examples include digital broadcasting, a wireless LAN, and a cellular system. OFDM has resistance with respect to a multipath propagation path and can prevent the occurrence of inter-symbol interference caused by a multipath delay wave by employing a cyclic prefix (CP). On the other hand, OFDM has a disadvantage in that a level of out-of-band radiation is large. Further, a peak-to-average power ratio (PAPR) tends to increase, and there is also a disadvantage in which it is vulnerable to distortion occurring in transmission and reception devices.

New modulation techniques capable of suppressing such out-of-band radiation which is a disadvantage of OFDM are emerging. These modulation techniques introduce a new concept called a subsymbol and can design a time and a frequency of a symbol flexibly by dividing one symbol into an arbitrary number of subsymbols. Further, these modulation techniques can reduce unnecessary out-of-band signal radiation by applying a pulse shaping filter to a symbol and performing waveform shaping, and the frequency use efficiency is expected to be improved.

These modulation techniques have various names such as universal filtered-OFDM (UF-OFDM), universal filtered multi-carrier (UFMC), filter bank multi-carrier (FBMC), and generalized OFDM (GOFDM). Particularly, since these modulation techniques can be regarded as generalized OFDM, they are also referred to as generalized frequency division multiplexing (GFDM), and this name is employed in this specification. A basic technology related to GFDM is disclosed, for example, in Patent Literature 1 and Non-Patent Literature 1.

CITATION LIST

Patent Literature

Patent Literature 1: US Patent Publication No. 2010/0189132

Non-Patent Literature

Non-Patent Literature 1: N. Michailow, et al., "Generalized Frequency Division Multiplexing for 5th Generation Cellular Networks," IEEE Trans. Commun., Vol. 62, no. 9, September 2014.

DISCLOSURE OF INVENTION

Technical Problem

However, in GFDM, an undesired spectral component (for example, an out-of-band frequency distortion component) may occur due to discontinuity of an amplitude between symbols. As a countermeasure against this, for example, a CP addition and a time window process which are performed in OFDM may be performed, but in this case, the frequency use efficiency may decrease, or the noise may increase.

In this regard, it is desirable to provide a mechanism which is capable of more efficiently suppressing the out-of-band frequency distortion component which may occur in GFDM.

Solution to Problem

According to the present disclosure, there is provided an apparatus including: a processing unit configured to perform filtering on data of a predetermined value and transmission data for every predetermined number of subcarriers, the data of the predetermined value being mapped to a subsymbol of an end portion in a time direction in a unit resource including one or more subcarriers and multiple subsymbols, the transmission data being mapped to another subsymbol in the unit resource.

In addition, according to the present disclosure, there is provided an apparatus including: a processing unit configured to acquire transmission data from data of a predetermined value and the transmission data in a signal filtered for every predetermined number of subcarriers, the data of the predetermined value being mapped to a subsymbol of an end portion in a time direction in a unit resource including one or more subcarriers and multiple subsymbols, the transmission data being mapped to another subsymbol in the unit resource.

In addition, according to the present disclosure, there is provided a method including: performing, by a processor, filtering on data of a predetermined value and transmission data for every predetermined number of subcarriers, the data of the predetermined value being mapped to a subsymbol of an end portion in a time direction in a unit resource including one or more subcarriers and multiple subsymbols, the transmission data being mapped to another subsymbol in the unit resource.

In addition, according to the present disclosure, there is provided a program causing a computer to function as: a processing unit configured to perform filtering on data of a predetermined value and transmission data for every predetermined number of subcarriers, the data of the predetermined value being mapped to a subsymbol of an end portion in a time direction in a unit resource including one or more subcarriers and multiple subsymbols, the transmission data being mapped to another subsymbol in the unit resource.

Advantageous Effects of Invention

As described above, according to the present disclosure, a mechanism which is capable of more efficiently suppressing the out-of-band frequency distortion component which may occur in GFDM is provided. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
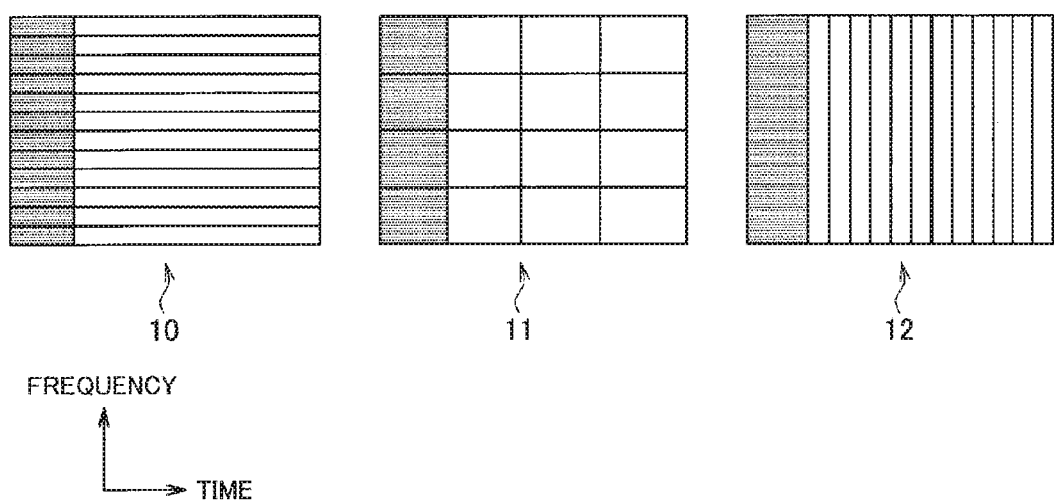
FIG. 1 is an explanatory diagram for describing a technique related to GFDM.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, there are cases in which elements having substantially the same functional configuration are distinguished by adding different letters after the same reference numeral. For example, a plurality of elements having substantially the same functional configuration are distinguished as terminal apparatuses 200A, 200B, and 200C as necessary. However, when it is not necessary to particularly distinguish a plurality of elements having substantially the same functional configuration, only the same reference numeral is attached. For example, when it is not necessary to particularly distinguish terminal apparatuses 200A, 200B and 200C, they are referred to simply as a "terminal apparatus 200."

Further, the description will proceed in the following order.
1. Instruction
1.1. GFDM
1.2. Technical problem
2. Schematic configuration of system
3. Configurations of apparatuses
3.1. Configuration of base station
3.2. Configuration of terminal apparatus
4. Technical features
5. Application examples
6. Conclusion 1. Introduction 1.1. GFDM First, GFDM will be described with reference to FIGS. 1 to 4.

FIG. 1 is an explanatory diagram for describing a concept of a symbol in GFDM. Reference numeral 10 indicates radio resources per symbol in OFDM. In the radio resources indicated by reference numeral 10, one symbol interval is occupied by a single symbol, and a plurality of subcarriers are included in a frequency direction. Further, in OFDM, a CP is added to each symbol. Reference numeral 12 indicates radio resources of an interval corresponding to one symbol of OFDM in a single carrier frequency division multiplexing (SC-FDM) signal. The radio resources indicated by reference numeral 12 are exclusively used by a single symbol over a carrier frequency, have a smaller symbol length than that in OFDM, and include a plurality of symbols in a time direction. Reference numeral 11 indicates radio resources of an interval corresponding to one symbol of OFDM in GFDM. The radio resources indicated by reference numeral 11 have an intermediate structure between the radio resources indicated by reference numeral 10 and the radio resources indicated by reference numeral 12. In other words, in GFDM, an interval corresponding to one symbol of OFDM is divided into an arbitrary number of subsymbols, and the number of subcarriers is smaller than that of OFDM accordingly. The structure of such radio resources makes it possible to change the symbol length in accordance with a parameter and to provide a more flexible transmission format.

Figure 2:
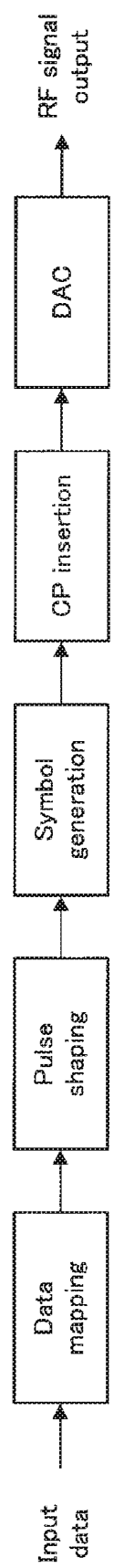
FIG. 2 is an explanatory diagram for describing a technique related to GFDM.

FIG. 2 is a diagram illustrating an example of a configuration example of a transmission device supporting GFDM. First, if data is input, the transmission device performs mapping of input data in order to apply filtering corresponding to the number of subcarriers and the number of subsymbols which are variably set. Further, here, the mapping for the subsymbol has an effect equivalent to that when over-sampling is performed as compared with OFDM. Then, the transmission device applies a pulse shaping filter to a predetermined number of subcarriers and a predetermined number of subsymbols (more specifically, multiplies by a predetermined filtering coefficient). Then, the transmission device performs a frequency-time transform on a waveform after pulse shaping, and generates a symbol. Finally, the transmission device adds a CP, applies a digital to analog converter (DAC), and outputs a radio frequency (RF) signal to a high frequency circuit.

Here, GFDM modulation is indicated by the following Formula.

[Math. 1]

$$g_{k,m}[n] = g[(n - mK) \bmod N] \cdot \exp\left[j2\pi \frac{k}{K} n\right] \quad (1)$$

[Math. 2]

$$x[n] = \sum_{m=0}^{M-1} \sum_{k=0}^{K-1} g_{k,m}[n] \cdot d_{k,m} \quad (2)$$

Here, K indicates the number of subcarriers, M indicates the number of subsymbols, $d_{k,m}$ is input data corresponding to an m-th subsymbol of a k-th subcarrier, x[n] is an n-th value of N (=KM) pieces of output data, and $g_{k,m}[n]$ is a coefficient of a filter.

The n-th output sample value x[n] of a GFDM symbol is obtained by summing all values obtained by multiplying the GFDM coefficients corresponding to the mapped input data. When n varies from 0 to N, the filter coefficient varies in accordance with the above Formula (2), and a total of N sample values are obtained per symbol. As a result, a sample value of a time waveform obtained by performing over-sampling on the subsymbol K times is generated. In this case, K times M subsymbols, that is, KM (=N), output values are obtained. The transmission device performs D/A conversion on the GFDM symbol obtained accordingly, performs desired amplification and frequency conversion through a high frequency circuit, and then transmits resulting data from an antenna.

Further, for example, a raised cosine (RC) filter, a root raised cosine (RRC) filter, an isotropic orthogonal transfer algorithm (IOTA) filter, or the like can be employed as the pulse shaping filter.

A relation between input data (vector) and output data (vector) in the formulated GFDM modulation is indicated by a matrix A as in the following Formula.

[Math. 3]

$$x = A \cdot d \quad (3)$$

Figure 3:
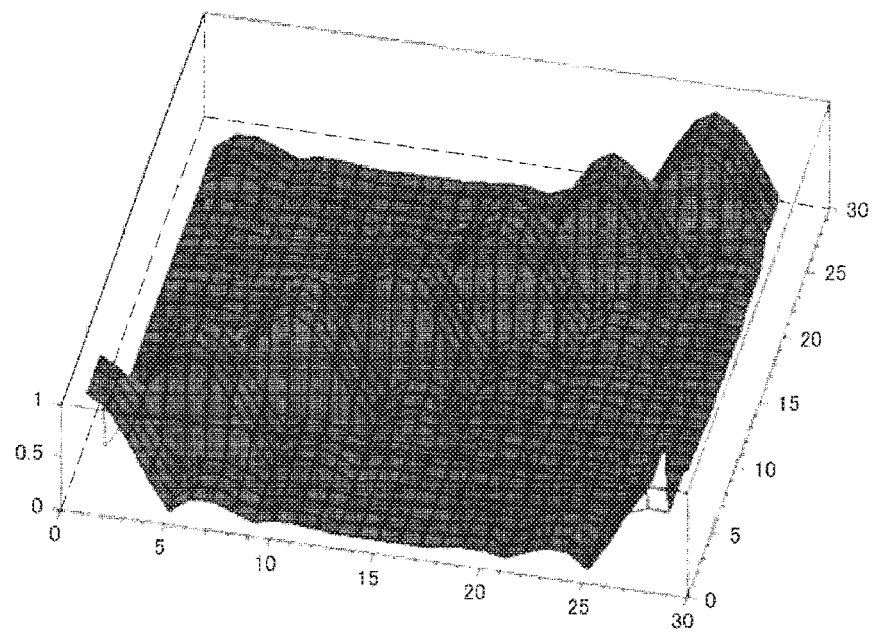
FIG. 3 is an explanatory diagram for describing a technique related to GFDM.

The transformation matrix A is a square matrix including complex elements having a size of KM×KM. FIG. 3 is a diagram on which amplitude values (absolute values) of the elements (that is, filter coefficients) of the transformation matrix A are plotted. FIG. 3 illustrates a case in which K=4, M=7, and an RC filter (α=0.4) is employed as a prototype filter of waveform shaping.

Figure 4:
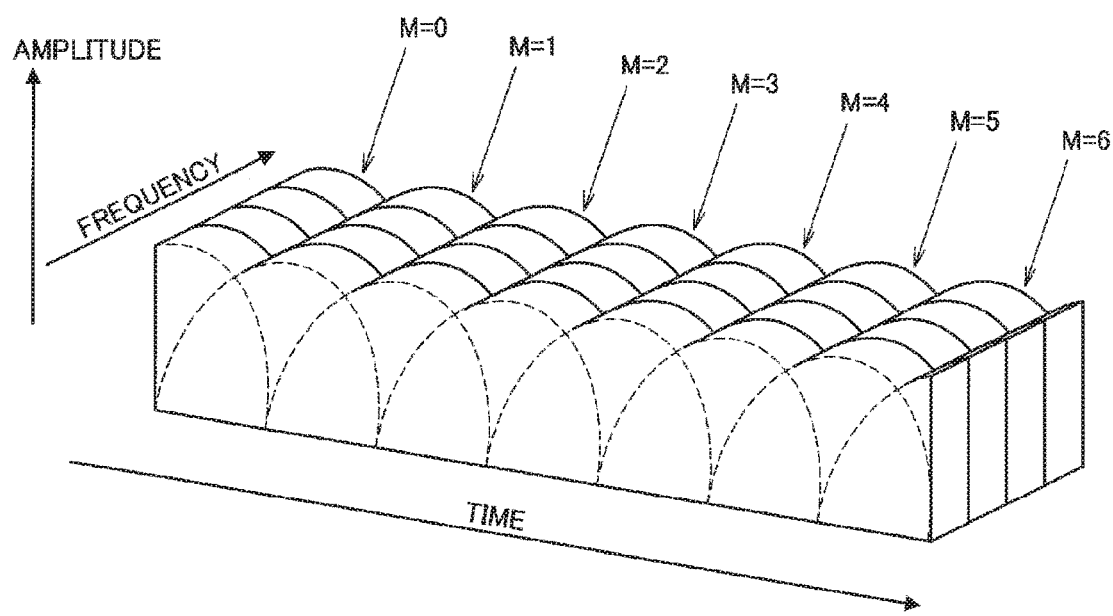
FIG. 4 is an explanatory diagram for describing a technique related to GFDM.

If such a transmission signal is generated through the GFDM modulation, the transmission signal has a structure illustrated in FIG. 4. FIG. 4 illustrates an amplitude value of a signal in one unit resource. Here, a time unit of the unit resources in GFDM is also referred to as a GFDM symbol. The GFDM symbol includes one or more subsymbols. Further, a frequency unit of the unit resources in GFDM is also referred to as a resource block. A resource block includes one or more subcarriers. Further, in the example illustrated in FIG. 4, the unit resource is divided into four subcarriers and seven subsymbols.

1.2. Technical Problem

In a case in which the GFDM symbol is converted into an analog signal, and arbitrary data is continuously transmitted, the out-of-band frequency distortion component is likely to occur due to the discontinuity of the amplitude between the symbols. More specifically, referring to FIG. 4, the unit resource corresponding to M=0 is divided temporally and present at both ends of the symbol, and a waveform discontinuous to a signal of M=0 of the unit resource of an adjacent symbol in the time direction is generated, and thus the out-of-band frequency distortion component is likely to occur. In order to prevent such a problem, a GFDM-specific CP is added to the signal of the unit resource.

Figure 5:
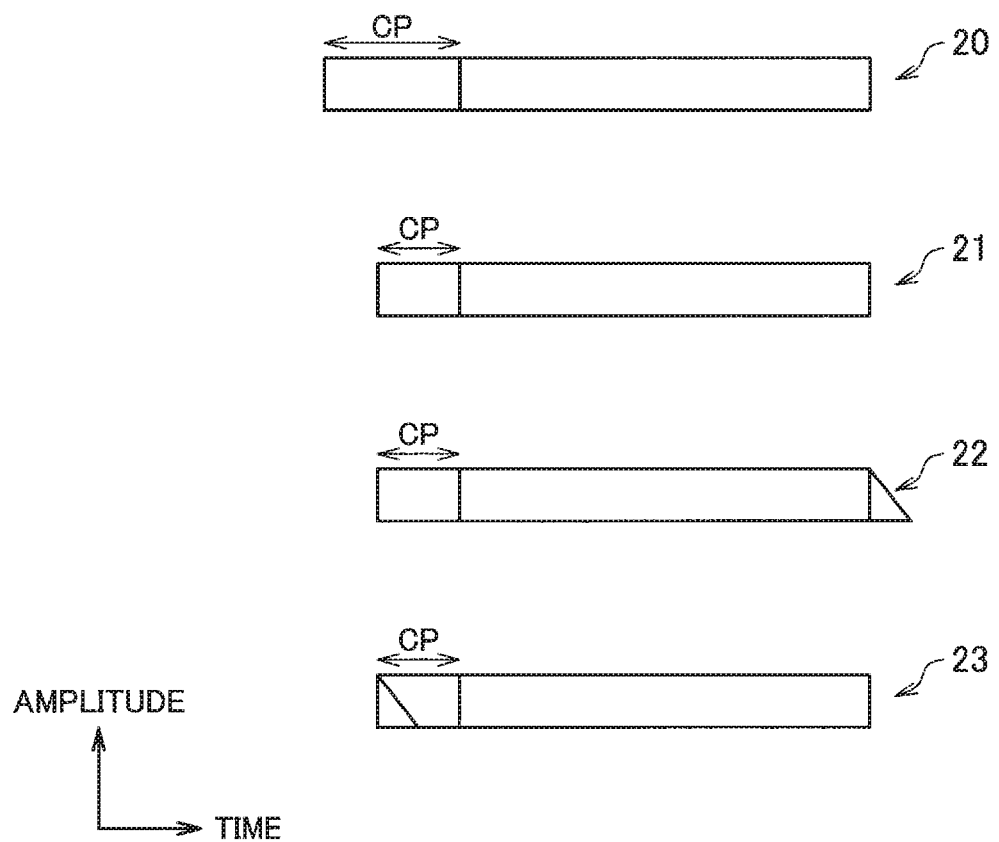
FIG. 5 is an explanatory diagram for describing a technical problem of an embodiment of the present disclosure.

An example of a method of generating the signal of the unit resources of GFDM will be described below with reference to FIG. 5. Reference numerals 20 to 23 indicate signals of the unit resources generated by respective generation methods, the horizontal axis denotes time, and the vertical axis denotes an amplitude value.

As a comparative example, an OFDM symbol is indicated by reference numeral 20. A CP of a sufficient length corresponding to a multipath characteristic of a propagation path is added to the OFDM symbol to secure a satisfactory reception characteristic.

On the other hand, GFDM symbols indicated by reference numerals 21 to 23 are proposed in Patent Literature 1 and Non-Patent Literature 1. Since it is preferable to add a CP of a length corresponding to a filter length of a pulse shaping filter to the GFDM symbol as indicated by reference numeral 21, there is an advantage in that the length of the CP is smaller than that of OFDM. A method of suppressing an amplitude at a joint between symbols and improving a spectrum characteristic by multiplying the GFDM symbol to which the CP is added by the window function as indicated by reference numeral 22 has also been proposed. However, in this case, a transmission signal length is longer than an original symbol length (that is, than reference numeral 21). Therefore, a method of reducing the transmission signal length by performing a termination process on the GFDM symbol multiplied by the window function as indicated by reference numeral 23 has also been proposed.

However, even in the case of the GFDM symbol indicated by reference numeral 23, the frequency use efficiency may decrease since the CP is used. Further, the noise component is added by the termination process, leading to a deterioration in a signal-to-noise ratio (S/N).

2. Schematic Configuration of System

Figure 6:
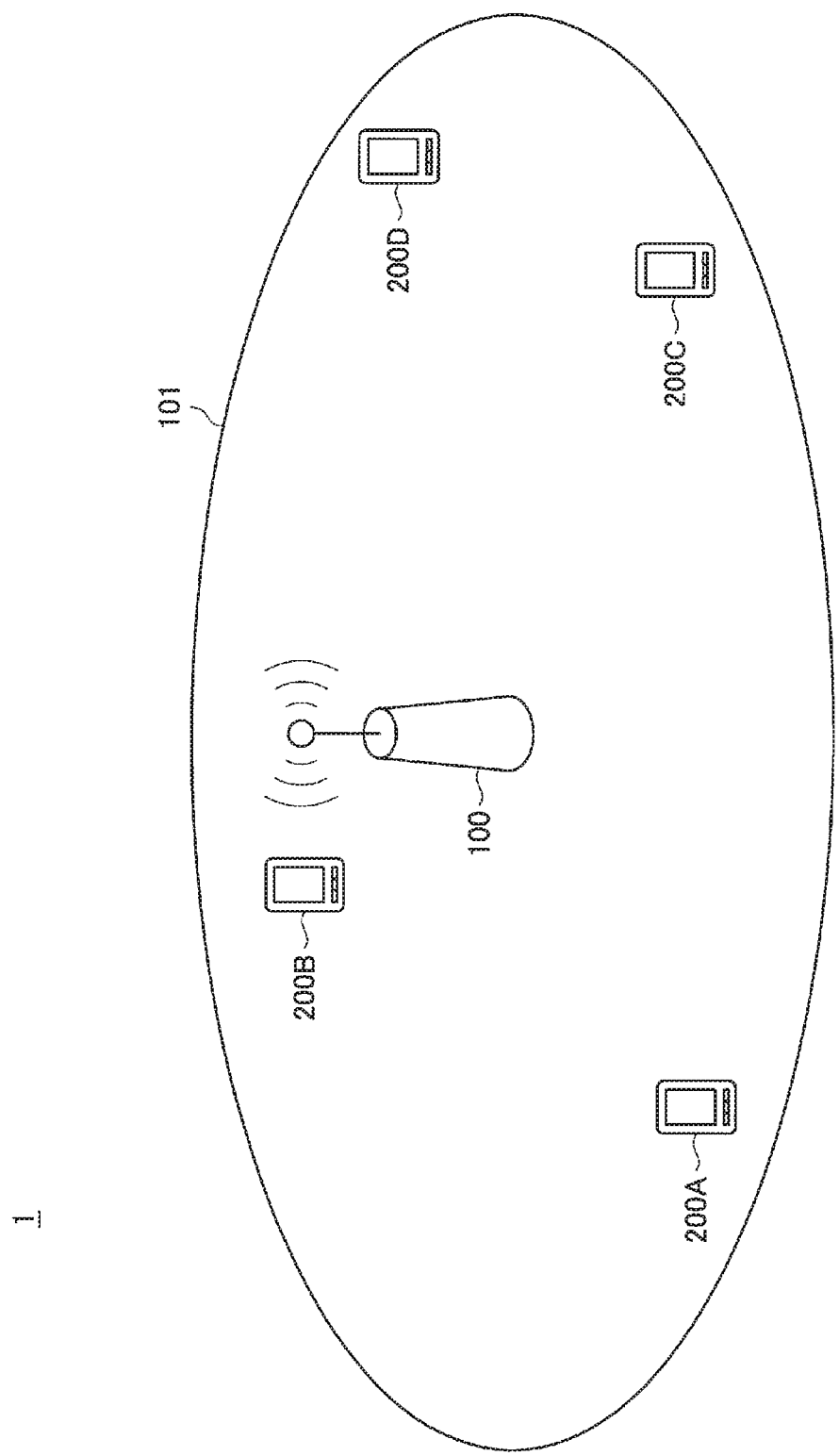
FIG. 6 is an explanatory diagram illustrating an example of a schematic configuration of a system according to the embodiment.

Next, a schematic configuration of a system 1 according to an embodiment of the present disclosure will be described with reference to FIG. 6. FIG. 6 is an explanatory diagram illustrating an example of a schematic configuration of the system 1 according to an embodiment of the present disclosure. Referring to FIG. 6, the system 1 includes a base station 100 and a terminal apparatus 200. Here, the terminal apparatus 200 is also referred to as a "user." The user may also be referred to as "user equipment (UE)." Here, the UE may be UE defined in LTE or LTE-A or may mean a communication device more generally.

(1) Base Station 100

The base station 100 is a base station of a cellular system (or a mobile communication system). The base station 100 performs wireless communication with a terminal apparatus (for example, the terminal apparatus 200) located within a cell 101 of the base station 100. For example, the base station 100 transmits a downlink signal to the terminal apparatus and receives an uplink signal from the terminal apparatus.

(2) Terminal Apparatus 200

The terminal apparatus 200 can perform communication in the cellular system (or the mobile communication system). The terminal apparatus 200 performs wireless communication with the base station of the cellular system (for example, the base station 100). For example, the terminal apparatus 200 receives a downlink signal from the base station and transmits an uplink signal to the base station.

(3) Multiplexing/Multiple Access

Particularly, in an embodiment of the present disclosure, the base station 100 performs wireless communication with a plurality of terminal apparatuses via orthogonal multiple access/non-orthogonal multiple access. More specifically, the base station 100 performs wireless communication with a plurality of terminal apparatuses 200 through multiplexing/multiple access using GFDM.

For example, the base station 100 performs wireless communication with a plurality of terminal apparatuses 200 by multiplexing/multiple access using GFDM in the downlink. More specifically, for example, the base station 100 multiplexes signals destined for a plurality of terminal apparatuses 200 using GFDM. In this case, for example, the terminal apparatus 200 removes one or more other signals serving as interference from a multiplexed signal including a desired signal (that is, a signal destined for the terminal apparatus 200), and decodes the desired signal.

The base station 100 may perform wireless communication with a plurality of terminal apparatuses by multiplexing/multiple access using GFDM in the uplink instead of the downlink or together with the downlink. In this case, the base station 100 may decode each of signals from the multiplexed signal including the signals transmitted from a plurality of terminal apparatuses.

(4) Supplement

The present technology can also be applied to multi-cell systems such as heterogeneous networks (HetNet) or small cell enhancement (SCE). Further, the present technology can also be applied to MTC devices and IoT devices.

3. Configuration of Devices

Figure 7:
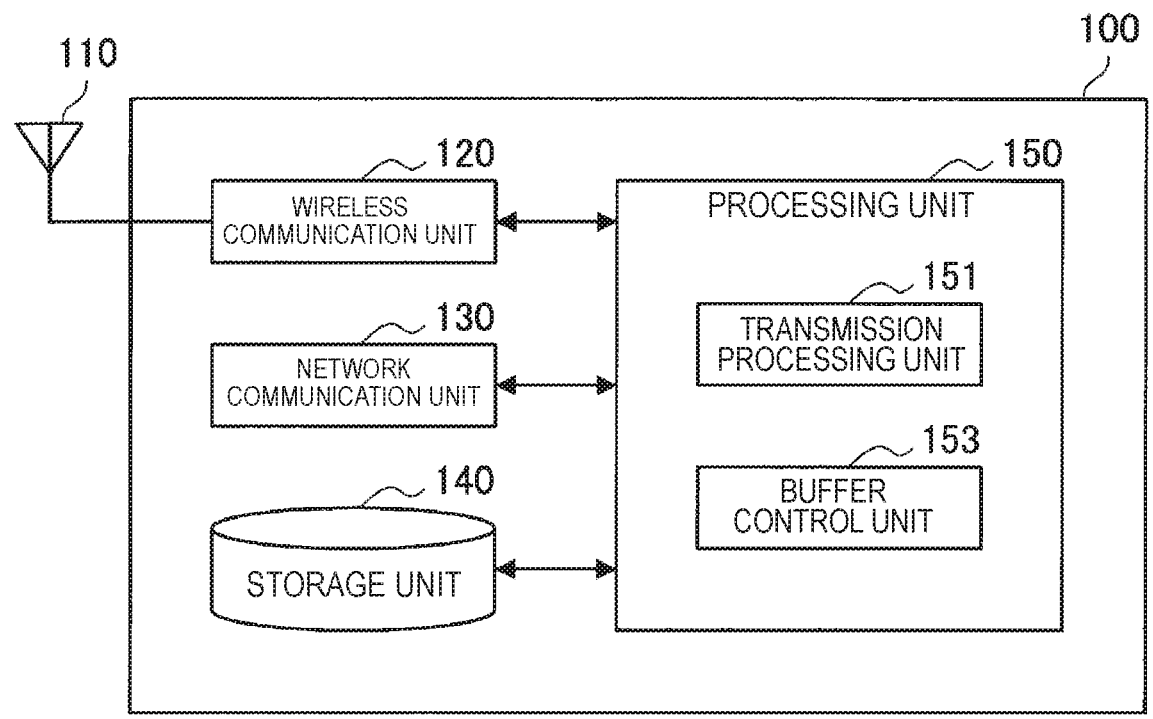
FIG. 7 is a block diagram illustrating an example of a configuration of a base station according to the embodiment.
Figure 8:
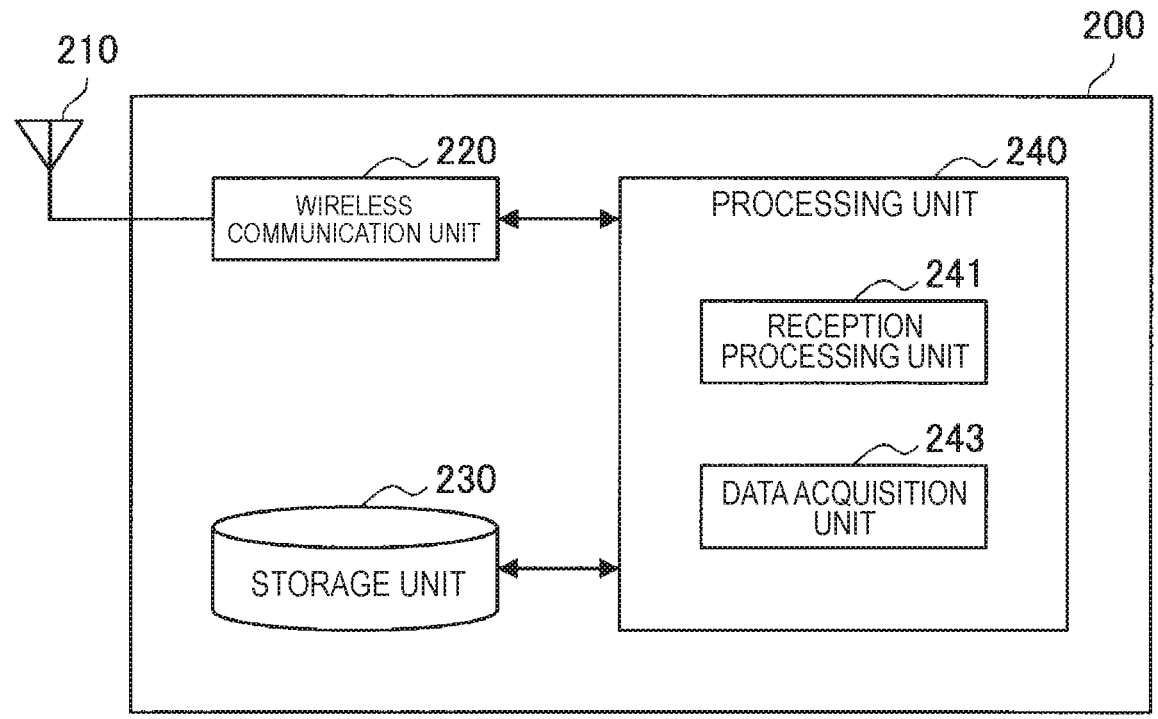
FIG. 8 is a block diagram illustrating an example of a configuration of a terminal apparatus according to the embodiment.

Next, configurations of the base station 100 and the terminal apparatus 200 according to the present disclosure will be described with reference to FIGS. 7 and 8.

3.1. Configuration of Base Station

First, an example of a configuration of the base station 100 according to an embodiment of the present disclosure will be described with reference to FIG. 7. FIG. 7 is a block diagram illustrating an example of a configuration of the base station 100 according to an embodiment of the present disclosure. Referring to FIG. 7, the base station 100 includes an antenna unit 110, a wireless communication unit 120, a network communication unit 130, a storage unit 140, and a processing unit 150.

(1) Antenna Unit 110

The antenna unit 110 radiates signals outputted from the wireless communication unit 120 into space as radio waves. Further, the antenna unit 110 converts radio waves in space into signals, and outputs the signals to the wireless communication unit 120.

(2) Wireless Communication Unit 120

The wireless communication unit 120 transmits and receives signals. For example, the wireless communication unit 120 transmits a downlink signal to the terminal apparatus, and receives an uplink signal from the terminal apparatus.

(3) Network Communication Unit 130

The network communication unit 130 transmits and receives information. For example, the network communication unit 130 transmits information to other nodes and receives information from the other nodes. Examples of other nodes include other base stations and core network nodes.

(4) Storage Unit 140

The storage unit 140 temporarily or permanently stores programs and various types of data for an operation of the base station 100.

(5) Processing Unit 150

The processing unit 150 provides various functions of the base station 100. The processing unit 150 includes a transmission processing unit 151 and a buffer control unit 153. Further, the processing unit 150 may further include components other than these components. In other words, the processing unit 150 may also perform operations other than the operations of these components.

Operations of the transmission processing unit 151 and the buffer control unit 153 will be described below in detail.

3.2. Configuration of Terminal Apparatus

First, an example of the configuration of the terminal apparatus 200 according to an embodiment of the present disclosure will be described with reference to FIG. 8. FIG. 8 is a block diagram illustrating an example of a configuration of a terminal apparatus 200 according to an embodiment of the present disclosure. Referring to FIG. 8, the terminal apparatus 200 includes an antenna unit 210, a wireless communication unit 220, a storage unit 230, and a processing unit 240.

(1) Antenna Unit 210

The antenna unit 210 radiates signals outputted from the wireless communication unit 220 into space as radio waves. Further, the antenna unit 210 converts radio waves in space into signals, and outputs the signals to the wireless communication unit 220.

(2) Wireless Communication Unit 220

The wireless communication unit 220 transmits and receives signals. For example, the wireless communication unit 220 receives a downlink signal from the base station and transmits an uplink signal to the base station.

(3) Storage Unit 230

The storage unit 230 temporarily or permanently stores programs and various types of data for an operation of the terminal apparatus 200.

(4) Processing Unit 240

The processing unit 240 provides various functions of the terminal apparatus 200. The processing unit 240 includes a reception processing unit 241 and a data acquisition unit 243. The processing unit 240 may further include components other than these components. In other words, the processing unit 240 may also perform operations other than the operations of these components.

An operation of the reception processing unit 241 and the data acquisition unit 243 will be described below in detail.

4. Technical Features

Technical features of the present embodiment will be described below under the assumption that the base station 100 is a transmission device, and the terminal apparatus 200 is a reception device.

(1) Mapping of Data of Predetermined Value

The base station 100 (for example, the transmission processing unit 151) maps data of a predetermined value with a subsymbol of an end portion in a time direction in a unit resource including one or more subcarriers and a plurality of subsymbols. Further, the base station 100 (for example, the transmission processing unit 151) maps transmission data (for example, user data) with another subsymbol in the unit resource. With the mappings, the data of the predetermined value is mapped to an end portion which may overlap another unit resource which is adjacent to a unit resource to be mapped to the transmission data in the time direction. Further, the base station 100 (for example, the transmission processing unit 151) performs GFDM modulation on the data mapped to the unit resource. More specifically, the base station 100 performs filtering (that is, applies a pulse shaping filter) for every predetermined number of subcarriers as a process for GFDM. Since the discontinuity of the amplitude between the GFDM symbols is suppressed by the mapping of the data of the predetermined value, it is possible to suppress the undesired spectrum component that occurred in the GFDM modulation. Further, since the GFDM modulation has been described above, detailed description thereof is omitted here.

The subsymbol of the end portion may be a first subsymbol of the unit resource in the time direction. Of course, the subsymbol of the end portion may be a last subsymbol of the unit resource in the time direction. Further, the subsymbol of the end portion may mean both of them. However, if a characteristic of a transformation matrix in which a peak of an amplitude value appears in a diagonal component as illustrated in FIG. 3 is considered, it is preferable that the subsymbol of the end portion be the subsymbols at both ends of the unit resource in the time direction.

All the data of the predetermined value mapped to the subsymbol of the end portion is data of the same value. For example, the predetermined value may be zero. In other words, in the subsymbol of the end portion, zero may be mapped to all the subcarriers. In this case, the discontinuity of the amplitude between the GFDM symbols can be further suppressed.

The base station 100 (for example, the buffer control unit 153) may control a data length of the data of the predetermined value and a data length of the transmission data which are mapped to the unit resource. In other words, the base station 100 can variably set a ratio between the data of the predetermined value and the transmission data in the unit resource. Particularly, the base station 100 (for example, the buffer control unit 153) may set a length equal to the number of subcarriers of the unit resource as the data length of the data of the predetermined value. In other words, the data of the predetermined value may be mapped only to the first subsymbol. In this case, it is possible to suppress a reduction in an information amount of the transmission data occupied by each symbol most effectively.

An example in which the predetermined value is zero, and zero is mapped only to the first subsymbol will be described below with reference to FIGS. 9 and 10.

Figure 9:
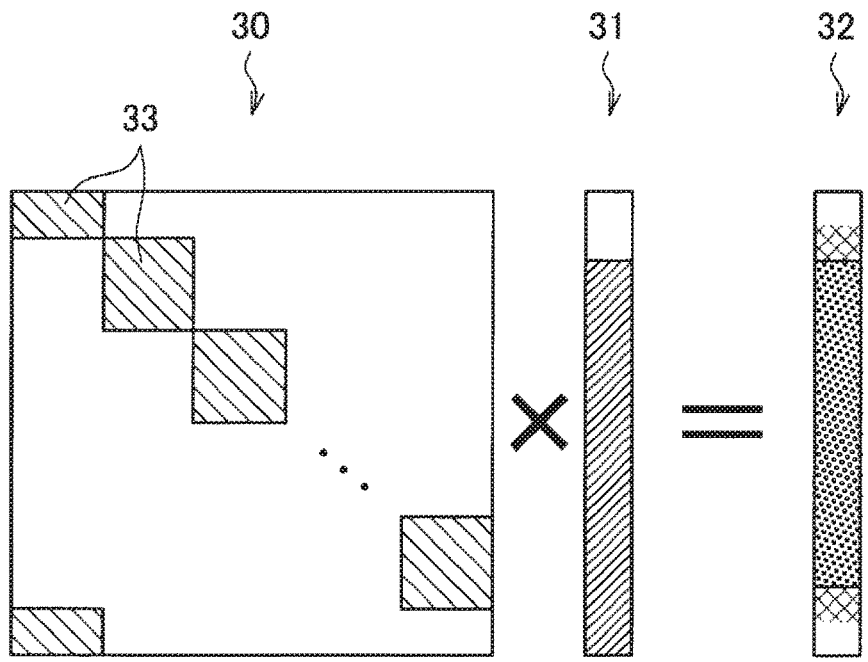
FIG. 9 is an explanatory diagram for describing technical features of the embodiment.

FIG. 9 is a diagram schematically illustrating an example of a calculation of Formula (3). Specifically, reference numeral 30 indicates the transformation matrix A, reference numeral 31 indicates input data d, and reference numeral 32 indicates output data x. A hatched portion in FIG. 9 is a portion in which the amplitude is large, and darker hatching indicates that higher amplitude. Reference numeral 33 indicates a peak portion of the filter coefficient. Further, reference numeral 34 indicates a portion to which zero is mapped among the input data. As indicated by reference numeral 32, it can be understood that the amplitudes of both ends of the output data (that is, both ends in the time direction) are small (for example, zero). For this reason, it is possible to suppress the out-of-band frequency distortion component caused by the discontinuity of the amplitude between the symbols. Accordingly, it is possible to prevent the application of the window function filter for suppressing the out-of-band frequency distortion components or to keep using an extremely slight window function.

Figure 10:
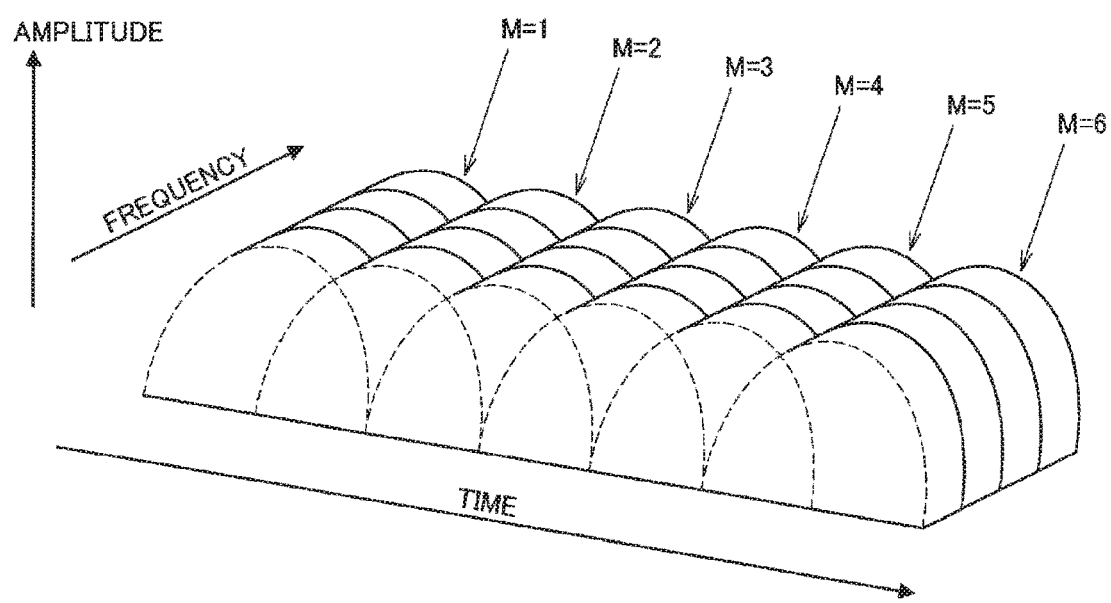
FIG. 10 is an explanatory diagram for describing technical features of the embodiment.

FIG. 10 is a diagram illustrating a structure of the transmission signal generated as described above, more specifically, the amplitude value of the transmission signal in one unit resource. Referring to FIG. 10, it can be understood that the amplitude is zero in the subsymbol portion of M=0 as compared with FIG. 4. Thus, the signal of M=6 does not overlap the signal of M=0 of another unit resource which is adjacent in the time direction (more precisely, overlaps a signal whose amplitude is zero), and thus the out-of-band frequency distortion component caused by the discontinuity of the amplitude between the symbols is suppressed.

Meanwhile, the terminal apparatus 200 (for example, reception processing unit 241) receives the GFDM modulated signal. Then, the terminal apparatus 200 (for example, the data acquisition unit 243) acquires reception data from the data of the predetermined value mapped to the subsymbol of the end portion of the unit resource in the time direction and the reception data mapped to another subsymbol of the unit resource (for example, user data). Accordingly, the terminal apparatus 200 can acquire the user data transmitted from the base station 100 by excluding the data of the added predetermined value to suppress the discontinuity of the amplitude between the GFDM symbols.

(2) Performance Evaluation

In a case in which the mapping of the data of the predetermined value is performed, the information amount of the transmission data occupied by each symbol is reduced. Therefore, the frequency use efficiency is decreased to some extent. For example, in the example illustrated in FIG. 10, since the transmission data is mapped to six subsymbols among seven subsymbols, a loss of the data transfer efficiency is about 14%. However, in a case in which the transmission data is localized in terms of time or frequency, an excellent tolerance to a certain degree of multipath is known to be exerted although the CP is not added. For example, in "Design of pulse shaping OFDM/OQAM systems for high data-rate transmission over wireless channels" by H. Bölcskei et al., IEEE International Conference on Communication, June, 1999, it is stated that a signal in which transmission data is localized in terms of time or frequency has a tolerance to dispersion of time and frequency signal component at the time of transmission.

In other words, the CP can be omitted appropriately as long as such a tolerance is allowed. Further, when the CP is omitted, it is possible to alleviate the decrease in the frequency use efficiency caused by the mapping of the data of the predetermined value.

For example, a case in which a CP with a time length corresponding to one subsymbol is added to the transmission data mapped to seven subsymbols is assumed. In this case, since the transmission data is mapped to seven subsymbols among eight subsymbols, the loss of the data transfer efficiency is about 12%. Therefore, in the technique of mapping the data of the predetermined value and omitting the addition of the CP, the frequency use efficiency merely decreases by only about 2% as compared with the technique of adding the CP without mapping the data of the predetermined value. Further, if the number of subsymbols is large, these differences will be smaller.

It is also assumed that both a prefix and a suffix (CS: cyclic suffix) are added before and after transmission data mapped to seven subsymbols. In this case, since transmission data is mapped to seven subsymbols out of nine subsymbols, the loss of the data transfer efficiency is about 22%. Therefore, in the technique of mapping the data of the predetermined value and omitting the addition of the CP, the frequency use efficiency is improved as compared with the technique of adding the CP and the CS without mapping the data of the predetermined value.

Thus, in the technique of mapping the data of the predetermined value and omitting the addition of the CP, performance of an equivalent level or an improvement of performance is expected as compared with the technique of adding the CP without mapping the data of the predetermined value. Further, in the technique of mapping the data of the predetermined value and omitting the addition of the CP, it is possible to prevent a deterioration caused by an increase in noise or the like which occurs in a method of causing a suffix part to be superimposed on a prefix as indicated by reference numeral 23 of FIG. 5.

As described above, the method of generating the GFDM symbol according to the present embodiment is considered to show excellent performance in a communication environment in which a multipath is not relatively large. For example, millimeter waves, which are also expected to be utilized in cellular communication in the future, represent communication in which direct waves are considered to be dominant and are one example in which the application of the present technique is considered to be effective.

(3) Transmission Process

The above-described mapping of the data of the predetermined value can be realized by various methods. An example of the mapping method will be described below.

First Example

First, a first example will be described with reference to FIGS. 11 and 12.

Figure 11:
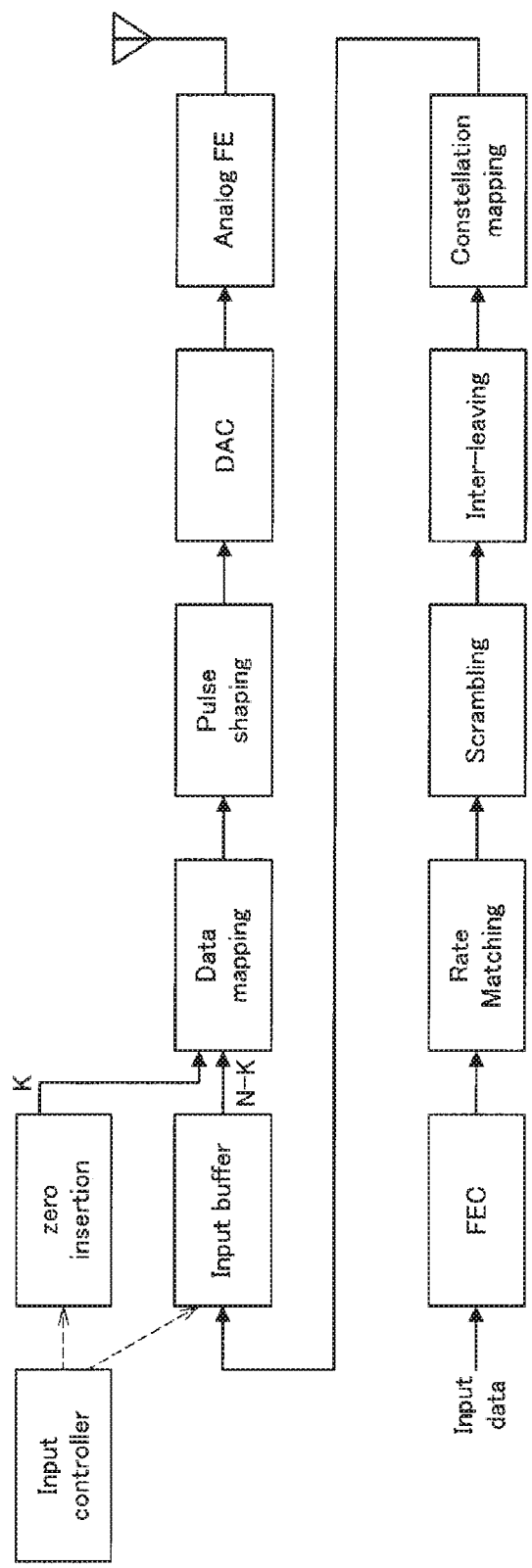
FIG. 11 is an explanatory diagram for describing technical features of the embodiment.
Figure 12:
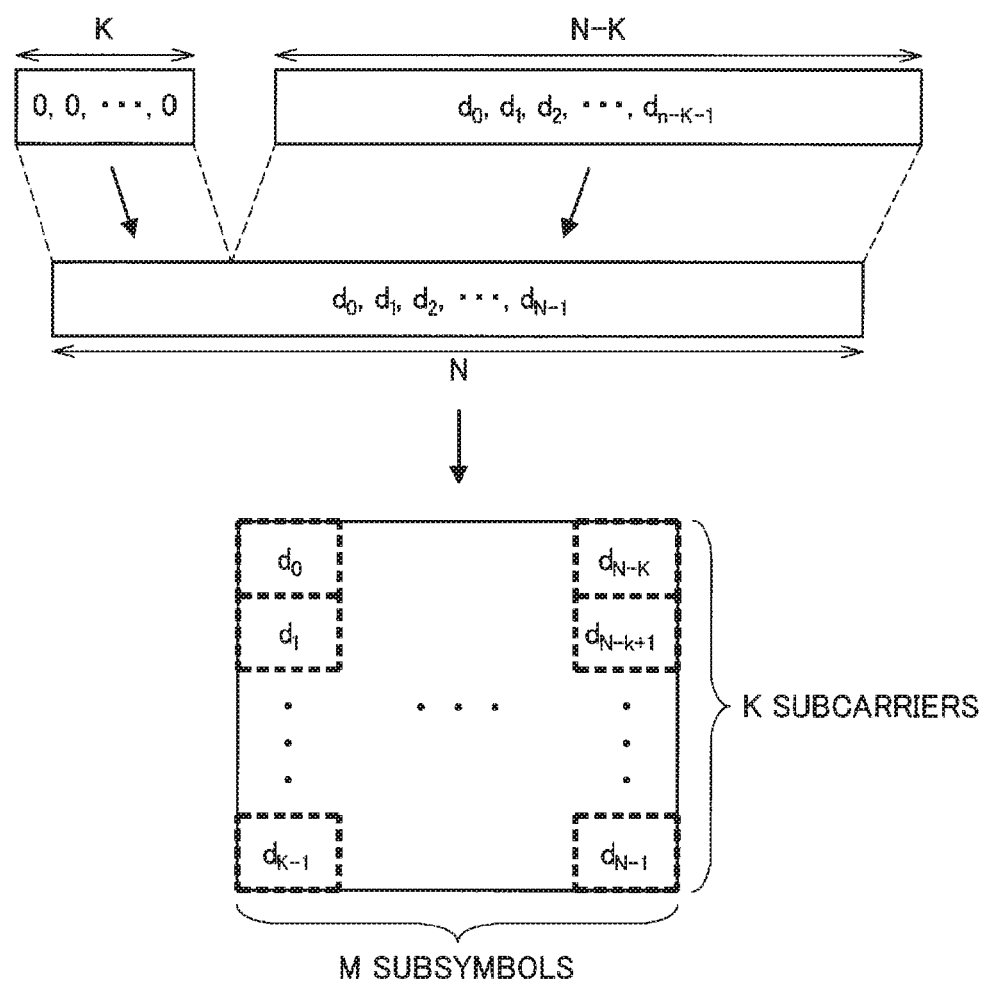
FIG. 12 is an explanatory diagram for describing technical features of the embodiment.

FIG. 11 is a block diagram illustrating a configuration example of a transmission device that executes a first mapping method. The transmission device performs forward error correction (FEC) coding, rate matching, scrambling, interleaving, and mapping (constellation mapping) from a bit string to a symbol (which may be, for example, a complex symbol or may also be referred to as a signal point) on the input data. The generated complex data is buffered in an input buffer. Then, the transmission device inserts the data of the predetermined value (zero data in the present example) into the transmission data supplied from the buffer and maps the resulting data to the unit resource. Specifically, the transmission device inserts K pieces of zero data, maps the zero data to the first subsymbol of the unit resource, and also maps (N−K) pieces of data supplied from the input buffer to other regions in the unit resource. At that time, the input controller adjusts the number K of zero data to be inserted and the number (N−K) of transmission data supplied from the input buffer. Here, an example of mapping the transmission data and the zero data to the unit resource is illustrated in FIG. 12 in further detail. As illustrated in FIG. 12, the N pieces of data in which the K pieces of zero data are inserted into the N−K pieces of transmission data are mapped to the unit resource including M subsymbols and K subcarriers. For example, the K pieces of zero data are mapped to $d_0$ to $d_{K-1}$, and the N−K pieces of transmission data are mapped to $d_K$ to $d_{N-1}$. After the mapping, the transmission device applies the pulse shaping filter, applies the DAC, performs signal processing by analog front end (FE), and transmits a wireless signal from the antenna.

With such a configuration, the discontinuity of the amplitude between the GFDM symbols after the pulse shaping is suppressed, and the out-of-band frequency distortion component can be suppressed. Further, it is possible to omit the addition of the CP which is used to suppress the out-of-band frequency distortion component.

Further, the input controller and the zero insertion function may correspond to the buffer control unit 153, the analog FE may correspond to the wireless communication unit 120, the antenna may correspond to the antenna unit 110, and the other components may correspond to the transmission processing unit 151. Of course, any other correspondence relation is allowed.

Second Example

Next, a second example will be described with reference to FIG. 13.

Figure 13:
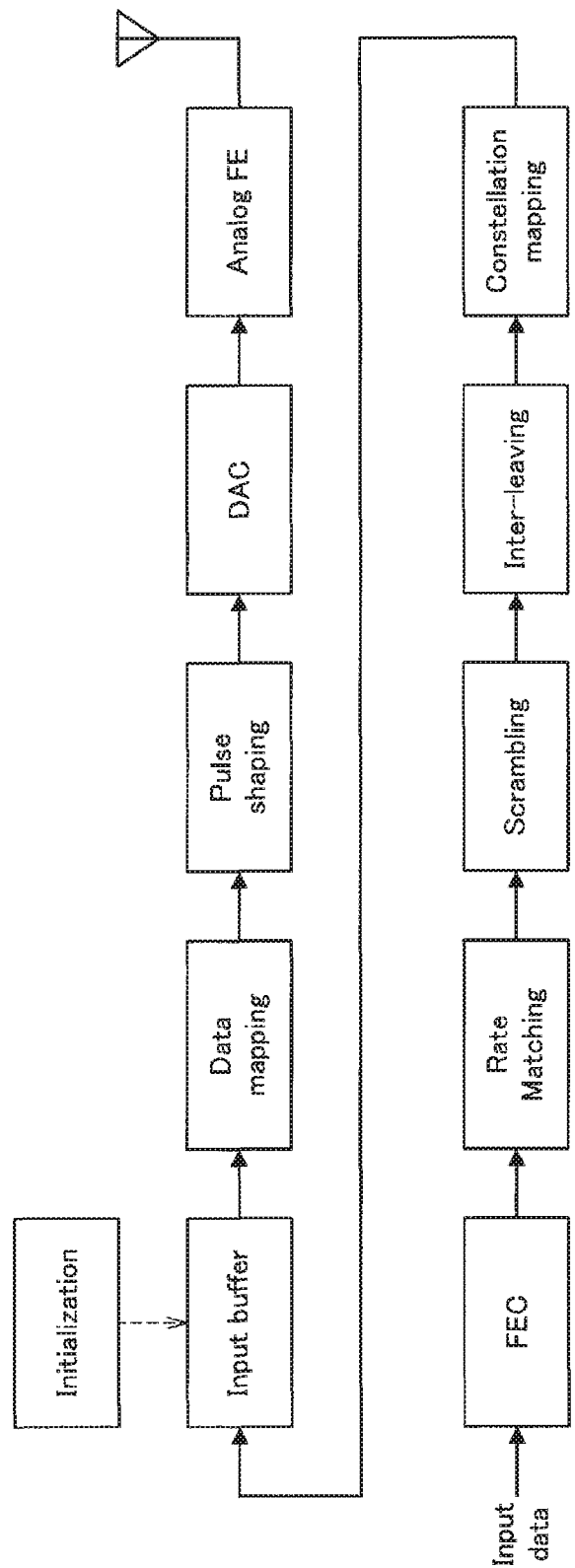
FIG. 13 is an explanatory diagram for describing technical features of the embodiment.

FIG. 13 is a block diagram illustrating a configuration example of a transmission device that executes a second mapping method. The transmission device performs FEC encoding, rate matching, scrambling, interleaving, and mapping from a bit string to a symbol on the input data. The generated complex data is buffered in the input buffer. Then, the transmission device initializes a buffer of a data length corresponding to the unit resource with a predetermined value (the zero data in the present example), arranges the transmission data, and performs mapping from the buffer to the unit resource. Specifically, the transmission device initializes the buffer capable of buffering N pieces of data with zero and then writes (N−K) pieces of transmission data to the buffer. Accordingly, K pieces of data in the buffer in which the transmission data is not written have the initial value of zero without change. Then, the transmission device maps the zero data of the initial value to the first subsymbol of the unit resource, and then maps the transmission data to the other region in the unit resource. Accordingly, mapping similar to that in the first example is implemented even in the present example. After the mapping, the transmission device applies the pulse shaping filter, applies the DAC, performs signal processing by the analog FE, and transmits the wireless signal from the antenna.

With such a configuration, the present example can achieve effects similar to the effects of the first example.

Further, the initialization function may correspond to the buffer control unit 153, the analog FE may correspond to the wireless communication unit 120, the antenna may correspond to the antenna unit 110, and the other components may correspond to the transmission processing unit 151. Of course, any other correspondence relation is allowed.

The examples of the mapping method have been described above. Next, the transmission process in the case of MIMO will be described.

Case of Multiple-Input and Multiple-Output (MIMO)

Next, the transmission process in the case of MIMO will be described with reference to FIG. 14.

Figure 14:
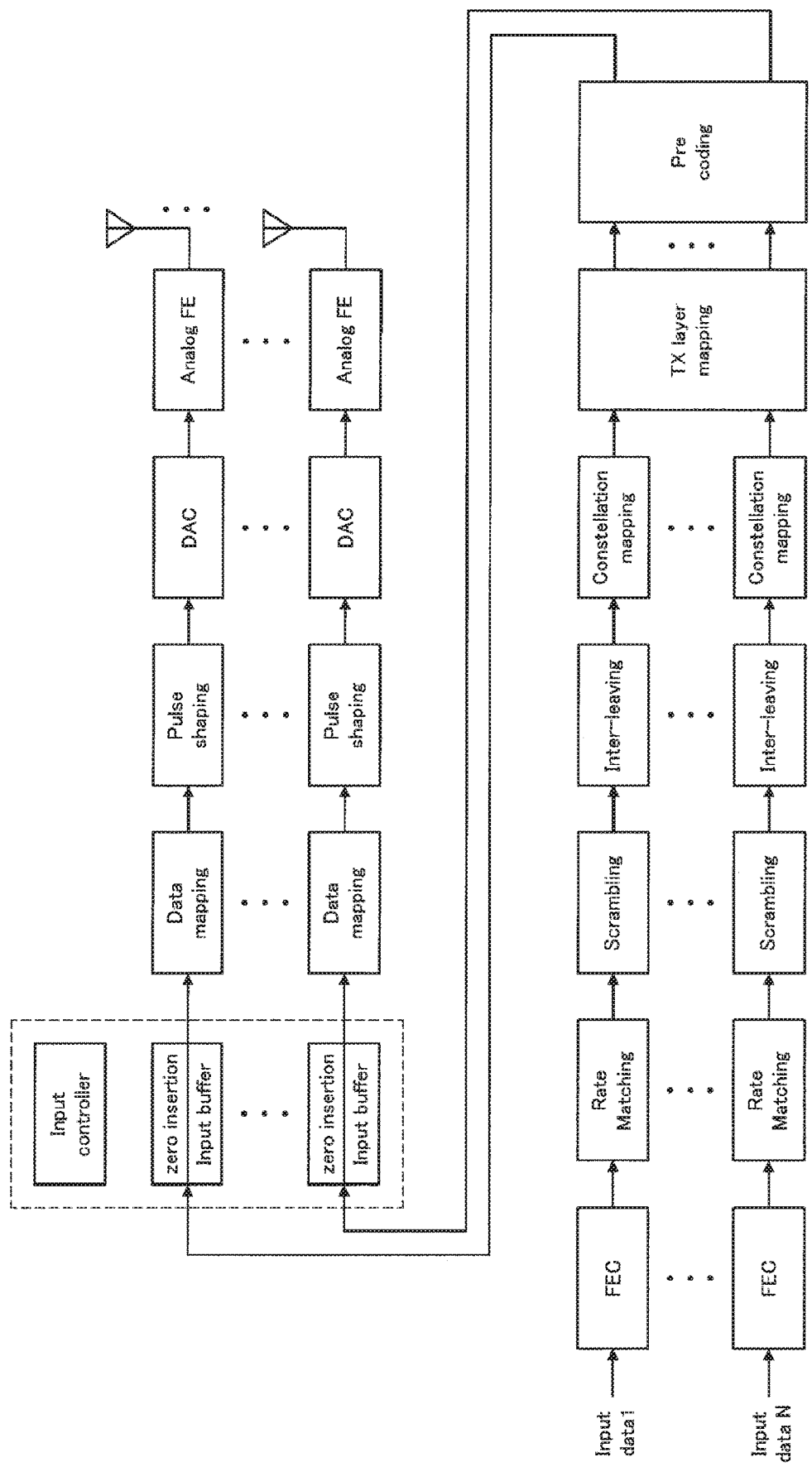
FIG. 14 is an explanatory diagram for describing technical features of the embodiment.

FIG. 14 is a block diagram illustrating a configuration example of a transmission device in the case of MIMO. As illustrated in FIG. 14, the transmission device performs FEC encoding, rate matching, scrambling, interleaving, and mapping from a bit string to a symbol for each pieces of transmission data to be multiplexed. Then, the transmission device performs multiplexing through transmission layer mapping and performs precoding for each multiplexed signal. A subsequent process is performed for each multiplexed signal. The transmission device performs data mapping using the first or second mapping method. In other words, the transmission device inserts K pieces of zero data into (N−K) pieces of transmission data supplied from the input buffer through the input controller or initializes N input buffers with zero, buffers the (N−K) pieces of transmission data, and performs mapping to the unit resource. After the mapping, the transmission device applies the pulse shaping filter, applies the DAC, performs signal processing by the analog FE, and transmits the wireless signal from the antenna.

(4) Reception Process

Next, the reception process will be described with reference to FIG. 15. Here, the reception process in the case of MIMO will be described as an example.

Figure 15:
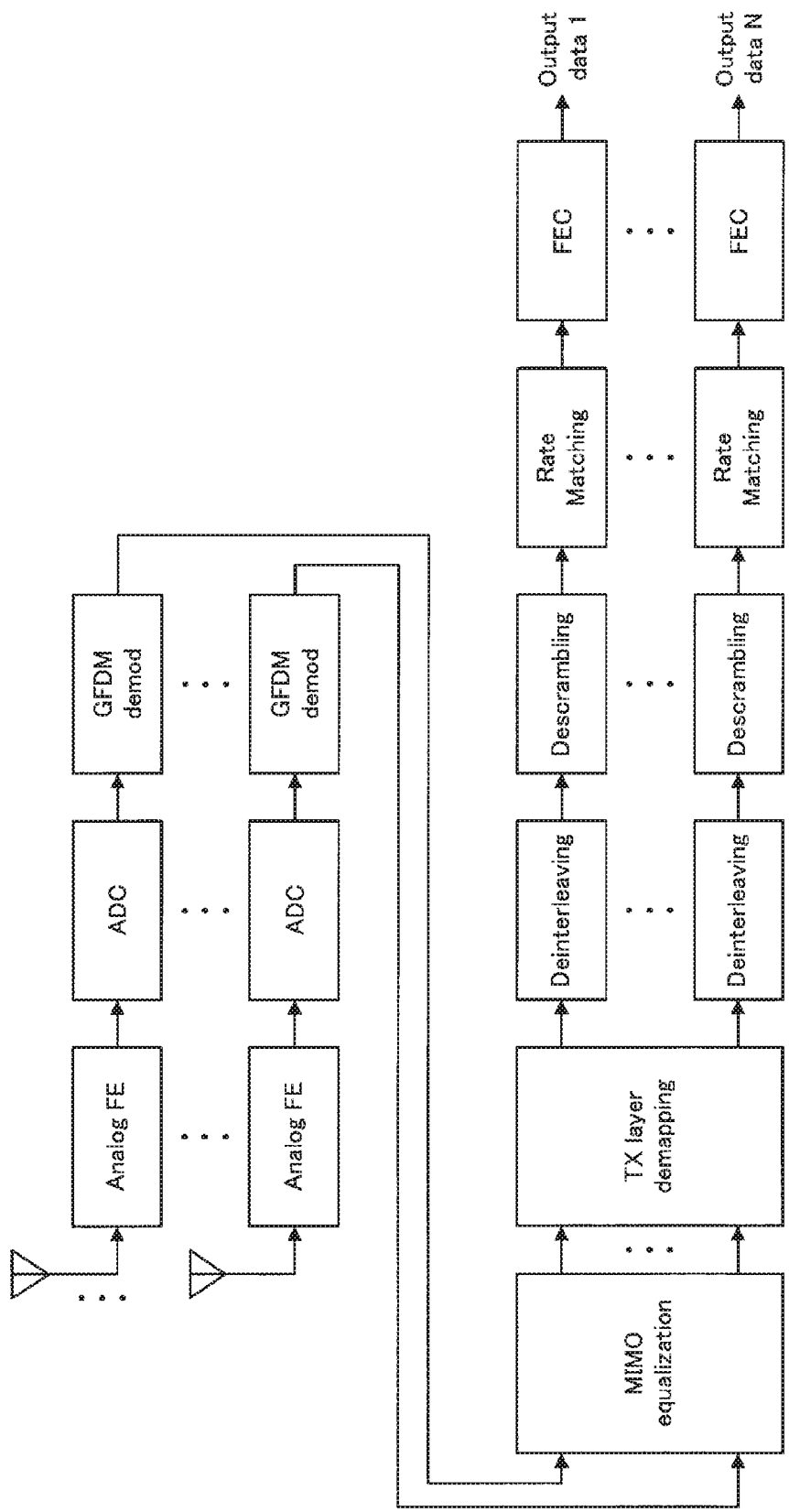
FIG. 15 is an explanatory diagram for describing technical features of the embodiment.

FIG. 15 is a block diagram illustrating a configuration example of the reception device. The reception device performs signal processing performed by the analog FE, A/D conversion performed by an analog to digital converter (ADC), and GFDM demodulation on the signal received through the antenna. In a GFDM demodulator, the reception device extracts original data d[0] to d[N−1] from received symbols x[0] to x[N−1]. To this end, the GFDM demodulator may be a circuit that multiplies a conjugate transpose matrix $A^H$ of A which is matching filter reception for the transformation matrix A of the GFDM used for transmission, a circuit that multiplies an inverse matrix $A^{-1}$ serving as zero force reception, a minimum mean square error (MMSE) reception circuit, or the like. Thereafter, the reception device performs MIMO equalization and de-mapping of the transmission layer. Thereafter, the reception device performs de-interleaving, de-scrambling, rate matching, and FEC decoding on each piece of reception data and outputs the resulting data.

Further, the GFDM demodulator may correspond to the data acquisition unit 243, the analog FE may correspond to the wireless communication unit 220, the antenna may correspond to the antenna unit 210, and the other components may correspond to the reception processing unit 241. Of course, any other correspondence relation is acceptable.

(5) Flow of Process

Then, examples of flows of processes of the base station 100 and the terminal apparatus 200 will be described with reference to FIG. 16 and FIG. 17.

Figure 16:
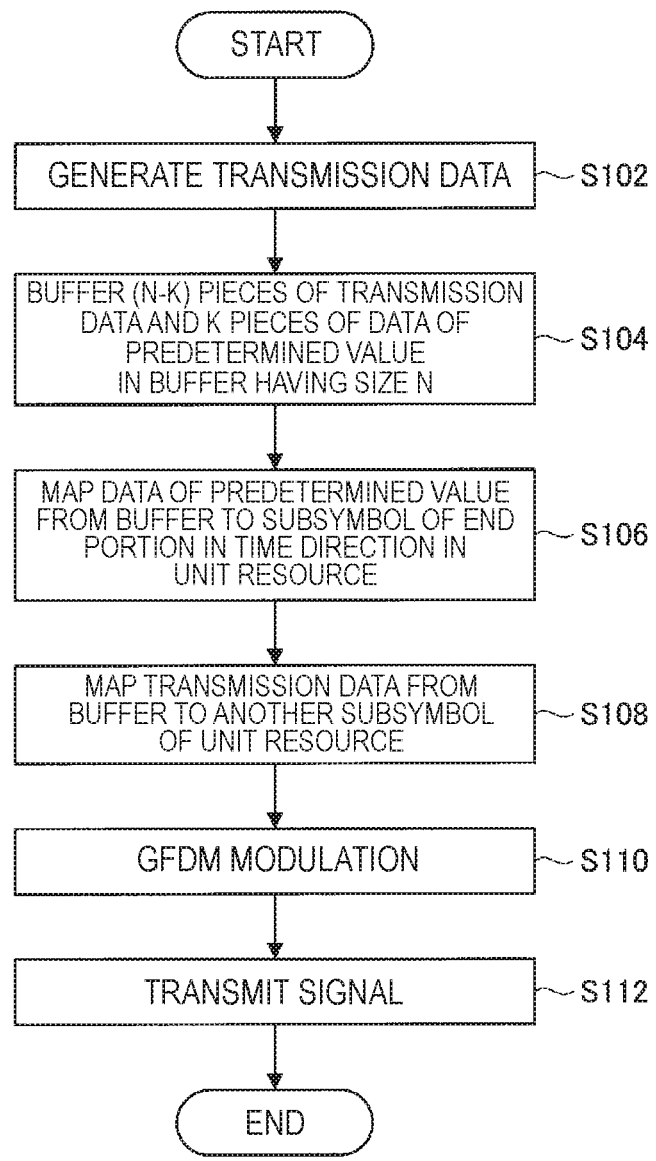
FIG. 16 is a flowchart illustrating an example of a flow of a transmission process executed in a base station according to the embodiment.

FIG. 16 is a flowchart illustrating an example of a flow of a transmission process executed in the base station 100 according to the present embodiment. As illustrated in FIG. 16, first, the base station 100 (for example, the transmission processing unit 151) generates the transmission data (step S102). Specifically, the base station 100 performs FEC encoding, rate matching, scrambling, interleaving, mapping to a complex symbol, and the like. Then, the base station 100 (for example, the buffer control unit 153) buffers (N−K) pieces of transmission data and K pieces of data of a predetermined value into a buffer having a size N (step S104). Then, the base station 100 (for example, the transmission processing unit 151) maps the data of the predetermined value from the buffer to the subsymbol of the end portion of the unit resource in the time direction (for example, the first subsymbol in the time direction) (step S106). Further, the base station 100 (for example, the transmission processing unit 151) maps the transmission data from the buffer to another subsymbol of the unit resource (for example, a subsymbol other than the first subsymbol in the time direction) (step S108). Here, as a specific method of using the buffer, the first example or the second example may be employed. Then, the base station 100 (for example, the transmission processing unit 151) performs the GFDM modulation (step S110) and transmits a signal (step S112).

Figure 17:
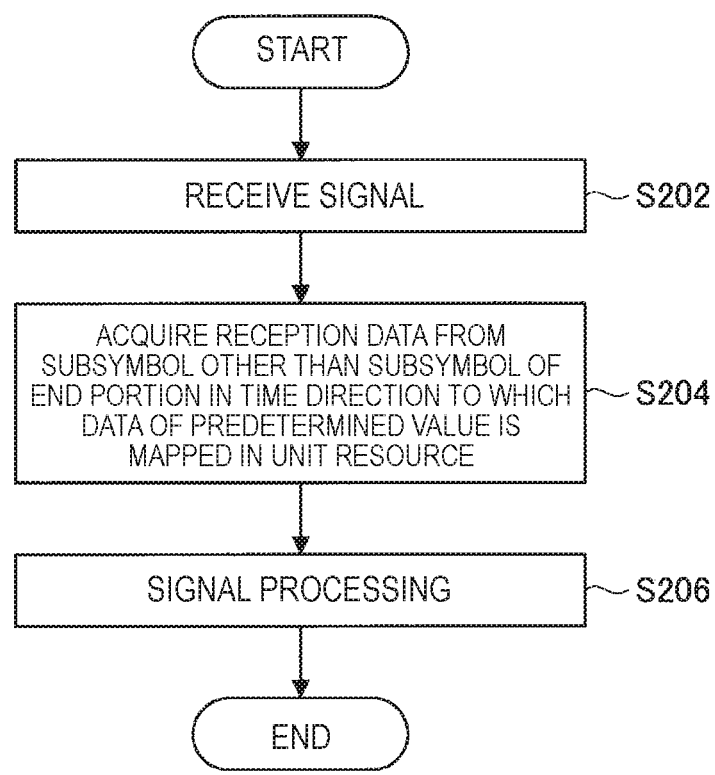
FIG. 17 is a flowchart illustrating an example of a flow of a reception process executed in a terminal apparatus according to the embodiment.

FIG. 17 is a flowchart illustrating an example of a flow of a reception process executed in the terminal apparatus 200 according to the present embodiment. As illustrated in FIG. 17, first, the terminal apparatus 200 (for example, the reception processing unit 241) receives a signal (step S202). Then, the terminal apparatus 200 (for example, data acquisition unit 243) acquires reception data from the subsymbol other than the subsymbol of the end portion in the time direction to which the data of the predetermined value is mapped in the unit resource (for example, a subsymbol other than the first subsymbol in the time direction) (step S204). Then, the terminal apparatus 200 (for example, the reception processing unit 241) performs signal processing such as equalization, conversion from complex data to bit strings, de-interleaving, de-scrambling, rate matching, and FEC decoding on the acquired reception data.

5. Application Examples

The technology according to the present disclosure is applicable to various products. The base station 100 may also be implemented, for example, as any type of evolved Node B (eNB) such as macro eNBs and small eNBs. Small eNBs may be eNBs that cover smaller cells than the macrocells, such as pico eNBs, micro eNBs, or home (femto) eNBs. Instead, the base station 100 may be implemented as another type of base station such as Nodes B or base transceiver stations (BTSs). The base station 100 may include the main apparatus (which is also referred to as base station apparatus) that controls wireless communication and one or more remote radio heads (RRHs) that are disposed at different locations from that of the main apparatus. Also, various types of terminals described below may function as the base station 100 by temporarily or semi-permanently executing the functionality of the base station. Furthermore, at least some of structural elements of the base station 100 may be realized in a base station apparatus or a module for a base station apparatus.

Further, the terminal apparatus 200 may be implemented, for example, as a mobile terminal such as smartphones, tablet personal computers (PCs), notebook PCs, portable game terminals, portable/dongle mobile routers, and digital cameras, or an in-vehicle terminal such as car navigation apparatuses. Further, the terminal apparatus 200 may be implemented as a machine type communication (MTC) terminal for establishing a machine to machine (M2M) communication. Furthermore, at least some of structural elements of the terminal apparatus 200 may be implemented as a module (e.g., integrated circuit module including a single die) that is mounted on these terminals.

5.1. Application Examples for Base Station

First Application Example

Figure 18:
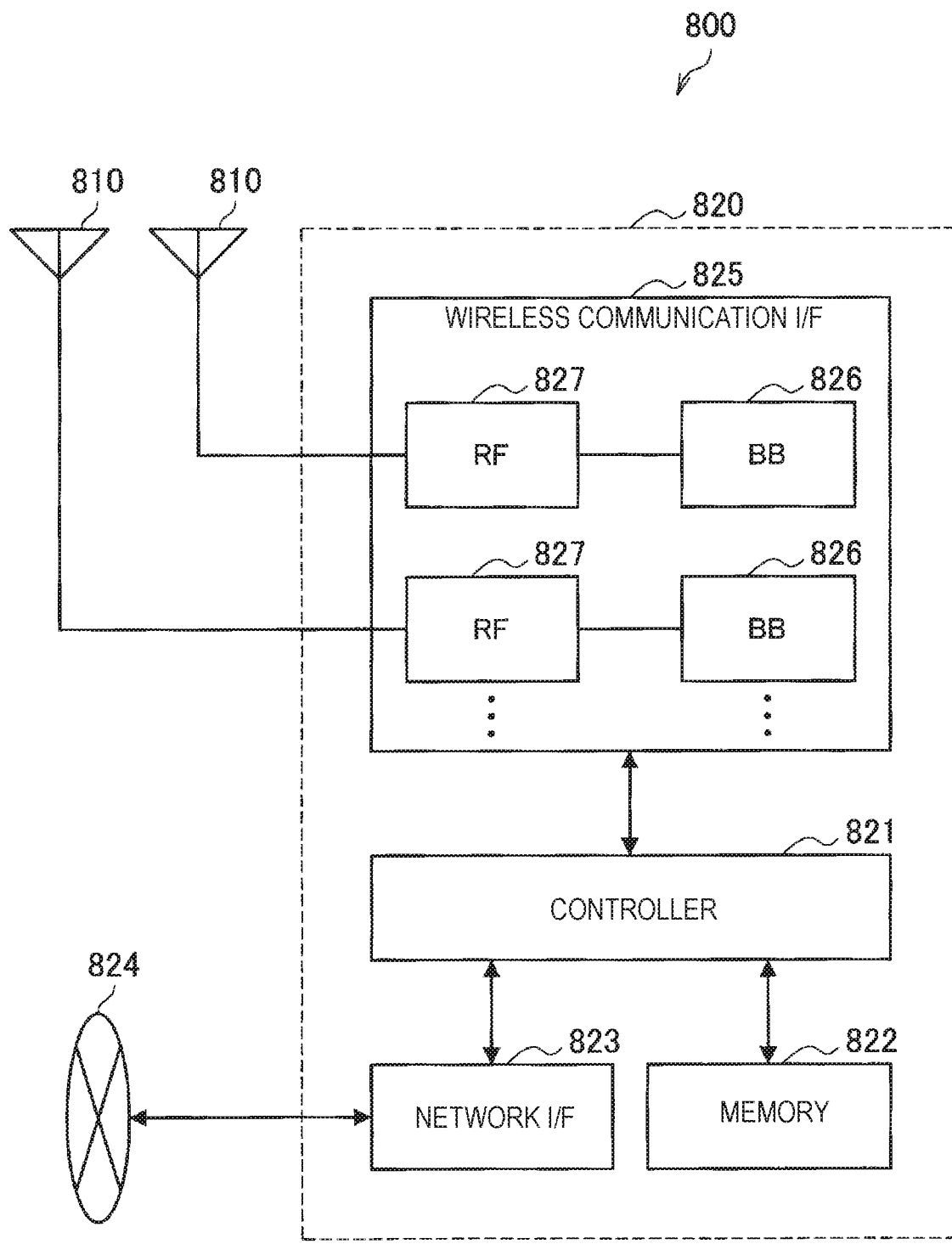
FIG. 18 is a block diagram illustrating a first example of a schematic configuration of an eNB.

FIG. 18 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g., a plurality of antenna elements constituting a MIMO antenna) and is used for the base station apparatus 820 to transmit and receive a wireless signal. The eNB 800 may include the plurality of the antennas 810 as illustrated in FIG. 18, and the plurality of antennas 810 may, for example, correspond to a plurality of frequency bands used by the eNB 800. It should be noted that while FIG. 18 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 18, and the plurality of BB processors 826 may, for example, correspond to a plurality of frequency bands used by the eNB 800. Further, the wireless communication interface 825 may also include a plurality of the RF circuits 827, as illustrated in FIG. 18, and the plurality of RF circuits 827 may, for example, correspond to a plurality of antenna elements. Note that FIG. 18 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 18, one or more structural elements included in the processing unit 150 (the transmission processing unit 151 and/or the buffer control unit 153) described with reference to FIG. 7 may be implemented by the wireless communication interface 825. Alternatively, at least some of these structural elements may be implemented by the controller 821. As an example, a module which includes a part (for example, the BB processor 826) or all of the wireless communication interface 825 and/or the controller 821 may be mounted in the eNB 800, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 800, and the wireless communication interface 825 (for example, the BB processor 826) and/or the controller 821 may execute the program. As described above, the eNB 800, the base station apparatus 820, or the module may be provided as an apparatus which includes the one or more structural elements, and the program for causing the processor to function as the one or more structural elements may be provided. In addition, a readable recording medium in which the program is recorded may be provided.

In addition, in the eNB 800 illustrated in FIG. 18, the wireless communication unit 120 described with reference to FIG. 7 may be implemented by the wireless communication interface 825 (for example, the RF circuit 827). Moreover, the antenna unit 110 may be implemented by the antenna 810. In addition, the network communication unit 130 may be implemented by the controller 821 and/or the network interface 823. Further, the storage unit 140 may be implemented by the memory 822.

Second Application Example

Figure 19:
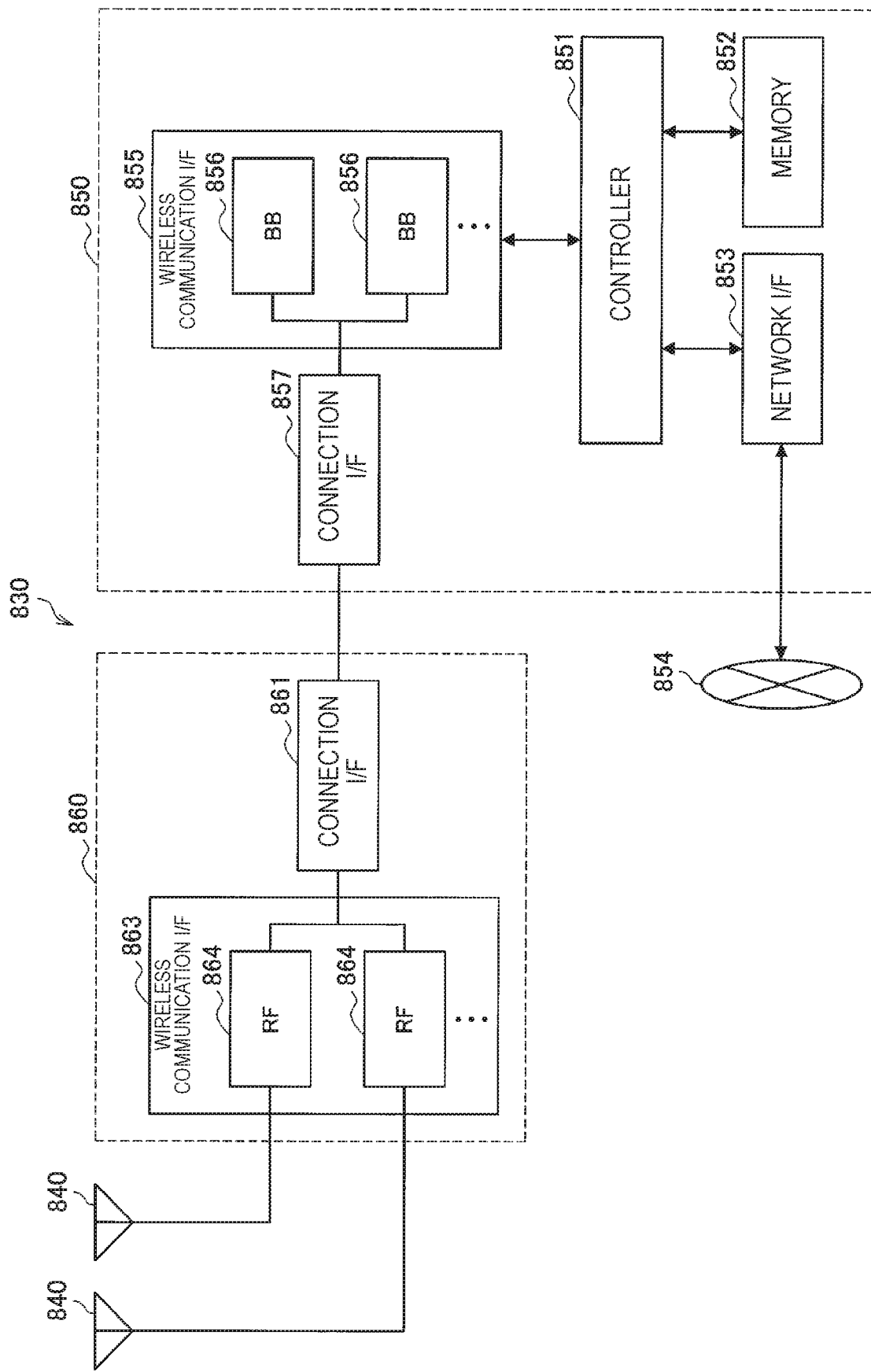
FIG. 19 is a block diagram illustrating a second example of a schematic configuration of an eNB.

FIG. 19 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. Further, the base station apparatus 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 19, and the plurality of antennas 840 may, for example, correspond to a plurality of frequency bands used by the eNB 830. Note that FIG. 19 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 18.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 18 except that the BB processor 856 is connected to an RF circuit 864 of the RRH 860 via the connection interface 857. The wireless communication interface 855 may include a plurality of the BB processors 856, as illustrated in FIG. 19, and the plurality of BB processors 856 may, for example, correspond to a plurality of frequency bands used by the eNB 830. Note that FIG. 19 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 19, and the plurality of RF circuits 864 may, for example, correspond to a plurality of antenna elements. Note that FIG. 19 illustrates an example in which the wireless communication interface 863 includes the plurality of RF circuits 864, but the wireless communication interface 863 may include the single RF circuit 864.

In the eNB 830 illustrated in FIG. 19, one or more structural elements included in the processing unit 150 (the transmission processing unit 151 and/or the buffer control unit 153) described with reference to FIG. 7 may be implemented by the wireless communication interface 855 and/or the wireless communication interface 863. Alternatively, at least some of these structural elements may be implemented by the controller 851. As an example, a module which includes a part (for example, the BB processor 856) or all of the wireless communication interface 855 and/or the controller 851 may be mounted in the eNB 830, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 830, and the wireless communication interface 855 (for example, the BB processor 856) and/or the controller 851 may execute the program. As described above, the eNB 830, the base station apparatus 850, or the module may be provided as an apparatus which includes the one or more structural elements, and the program for causing the processor to function as the one or more structural elements may be provided. In addition, a readable recording medium in which the program is recorded may be provided.

In addition, in the eNB 830 illustrated in FIG. 19, for example, the wireless communication unit 120 described with reference to FIG. 7 may be implemented by the wireless communication interface 863 (for example, the RF circuit 864). Moreover, the antenna unit 110 may be implemented by the antenna 840. In addition, the network communication unit 130 may be implemented by the controller 851 and/or the network interface 853. Further, the storage unit 140 may be implemented by the memory 852.

5.2. Application Examples for Terminal Apparatus

First Application Example

Figure 20:
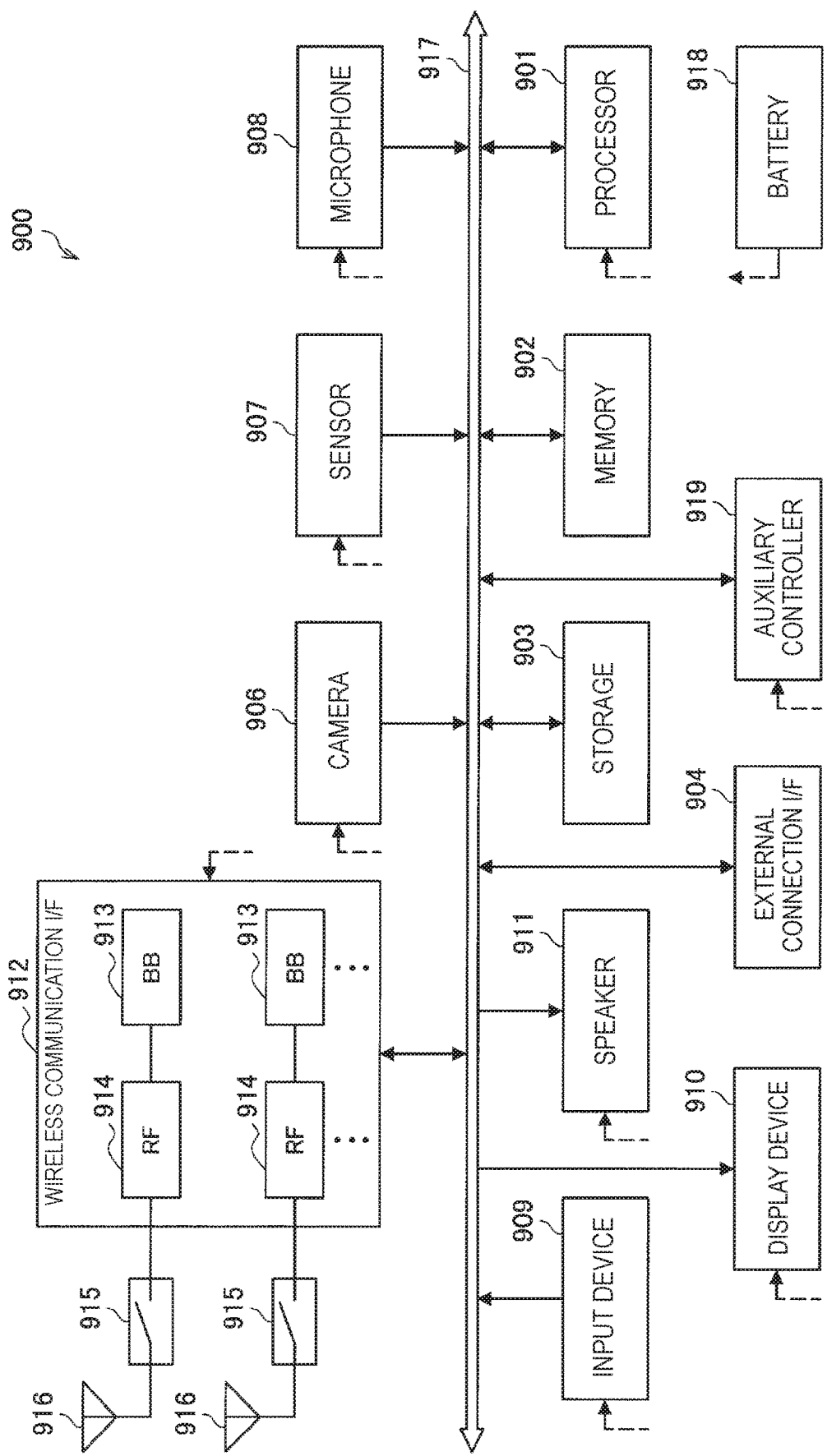
FIG. 20 is a block diagram illustrating an example of a schematic configuration of a smartphone.

FIG. 20 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 20. Note that FIG. 20 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 20. Note that FIG. 20 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 20 via a feeder line that is partially illustrated in the figure as a dashed line. The auxiliary controller 919, for example, operates a minimally necessary function of the smartphone 900 in a sleep mode.

In the smartphone 900 illustrated in FIG. 20, one or more structural elements included in the processing unit 240 (the reception processing unit 241 and/or the data acquisition unit 243) described with reference to FIG. 8 may be implemented by the wireless communication interface 912. Alternatively, at least some of these structural elements may be implemented by the processor 901 or the auxiliary controller 919. As an example, a module which includes a part (for example, the BB processor 913) or all of the wireless communication interface 912, the processor 901, and/or the auxiliary controller 919 may be mounted in the smartphone 900, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the smartphone 900, and the wireless communication interface 912 (for example, the BB processor 913), the processor 901, and/or the auxiliary controller 919 may execute the program. As described above, the smartphone 900 or the module may be provided as an apparatus which includes the one or more structural elements, and the program for causing the processor to function as the one or more structural elements may be provided. In addition, a readable recording medium in which the program is recorded may be provided.

In addition, in the smartphone 900 illustrated in FIG. 20, for example, the wireless communication unit 220 described with reference to FIG. 8 may be implemented by the wireless communication interface 912 (for example, the RF circuit 914). Moreover, the antenna unit 210 may be implemented by the antenna 916. Further, the storage unit 230 may be implemented by the memory 902.

Second Application Example

Figure 21:
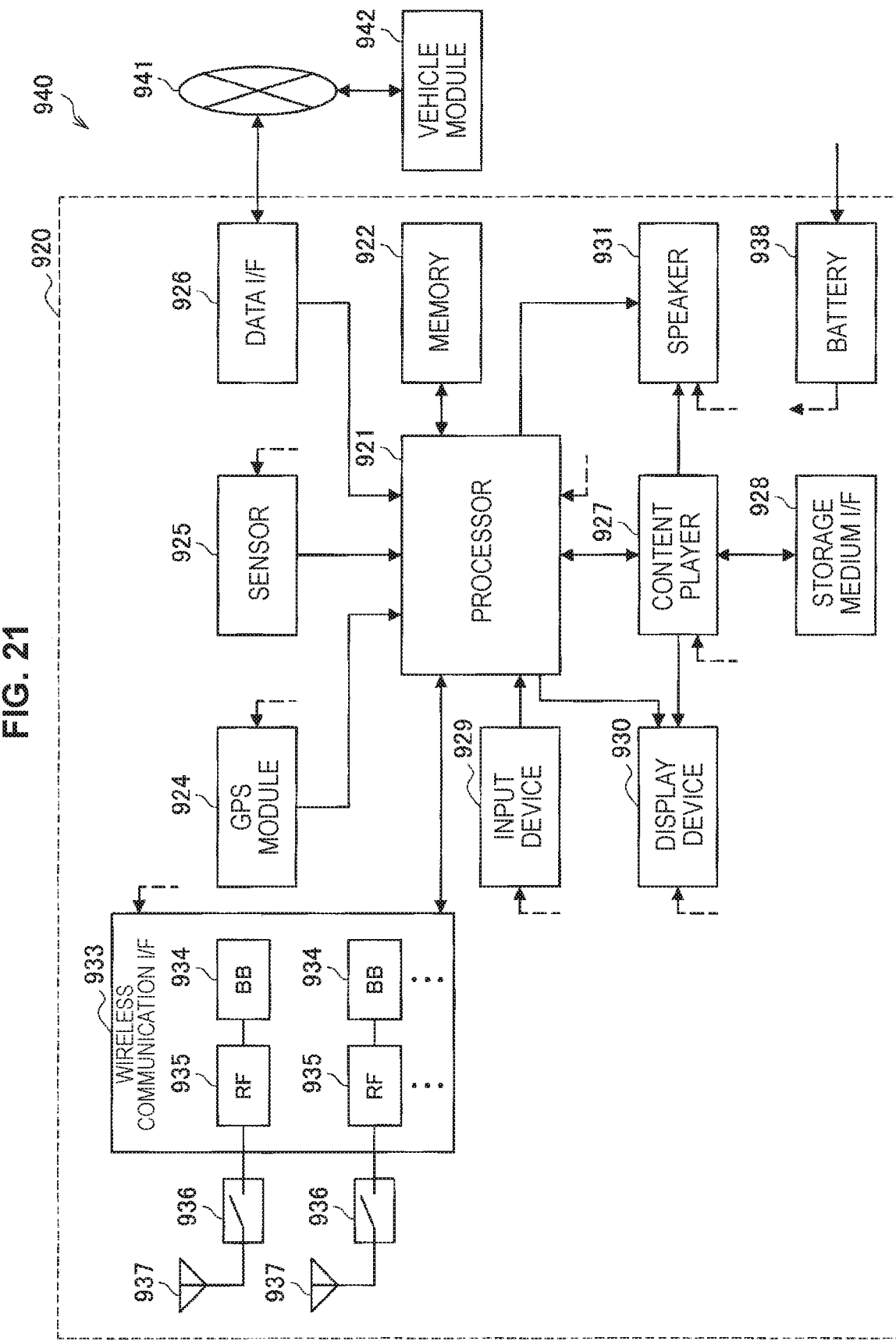
FIG. 21 is a block diagram illustrating an example of a schematic configuration of a car navigation apparatus.

FIG. 21 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 21. Note that FIG. 21 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 may include a plurality of antennas 937 as illustrated in FIG. 21. Note that FIG. 21 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 21 via a feeder line that is partially illustrated in the figure as a dashed line. Further, the battery 938 accumulates the electric power supplied from the vehicle.

In the car navigation apparatus 920 illustrated in FIG. 21, one or more structural elements included in the processing unit 240 (the reception processing unit 241 and/or the data acquisition unit 243) described with reference to FIG. 8 may be implemented by the wireless communication interface 933. Alternatively, at least some of these structural elements may be implemented by the processor 921. As an example, a module which includes a part (for example, the BB processor 934) or all of the wireless communication interface 933 and/or the processor 921 may be mounted in the car navigation apparatus 920, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the car navigation apparatus 920, and the wireless communication interface 933 (for example, the BB processor 934) and/or the processor 921 may execute the program. As described above, the car navigation apparatus 920 or the module may be provided as an apparatus which includes the one or more structural elements, and the program for causing the processor to function as the one or more structural elements may be provided. In addition, a readable recording medium in which the program is recorded may be provided.

In addition, in the car navigation apparatus 920 illustrated in FIG. 21, for example, the wireless communication unit 220 described with reference to FIG. 8 may be implemented by the wireless communication interface 933 (for example, the RF circuit 935). Moreover, the antenna unit 210 may be implemented by the antenna 937. Further, the storage unit 230 may be implemented by the memory 922.

The technology of the present disclosure may also be realized as an in-vehicle system (or a vehicle) 940 including one or more blocks of the car navigation apparatus 920, the in-vehicle network 941, and a vehicle module 942. In other words, the in-vehicle system (or a vehicle) 940 may be provided as an apparatus which includes the processing unit 240. The vehicle module 942 generates vehicle data such as vehicle speed, engine speed, and trouble information, and outputs the generated data to the in-vehicle network 941.

6. Conclusion

One embodiment of the present disclosure has been described above in detail with reference to FIGS. 1 to 21. As described above, the base station 100 performs the GFDM modulation on the data of the predetermined value mapped to the subsymbol of the end portion in the time direction in the unit resource including one or more subcarriers and a plurality of subsymbols and the transmission data mapped to another subsymbol in the unit resource. Thus, it is possible to suppress the discontinuity of the amplitude between the GFDM symbols, and it is possible to suppress the out-of-band frequency distortion component caused by the discontinuity of the amplitude between the symbols accordingly. Further, base station 100 can omit the addition of the CP and the CS, and it is possible to alleviate the decrease in the frequency use efficiency occurring when the mapping of the data of the predetermined value is performed accordingly.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiment, the example in which the base station 100 is the transmission device, and the terminal apparatus 200 is the reception device has been described, but the present technology is not limited to this example. For example, the terminal apparatus 200 may be the transmission device, and the base station 100 may be the reception device. In that case, the processing unit 240 has the functions of the transmission processing unit 151 and the buffer control unit 153, and the processing unit 150 has the functions of the reception processing unit 241 and the data acquisition unit 243. In addition, if device to device (D2D) communication is considered, both the transmission device and the reception device may be the terminal apparatus 200.

Further, the processes described using the flowcharts in this specification need not be necessarily executed in the described order. Several process steps may be executed in parallel. Further, an additional process step may be employed, and some process steps may be omitted. The same applies to the order of various blocks of signal processing illustrated in FIGS. 11, 14, and 15.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An apparatus including:
a processing unit configured to perform filtering on data of a predetermined value and transmission data for every predetermined number of subcarriers, the data of the predetermined value being mapped to a subsymbol of an end portion in a time direction in a unit resource including one or more subcarriers and multiple subsymbols, the transmission data being mapped to another subsymbol in the unit resource.

(2)
The apparatus according to (1), in which the subsymbol of the end portion is subsymbols at both ends of the unit resource in the time direction.

(3)
The apparatus according to (1) or (2), in which the processing unit controls a data length of the data of the predetermined value mapped to the unit resource and a data length of the transmission data.

(4)
The apparatus according to (3), in which the processing unit sets a length equal to a number of subcarriers of the unit resource as the data length of the data of the predetermined value.

(5)
The apparatus according to any one of (1) to (4), in which the processing unit inserts the data of the predetermined value into the transmission data and maps resulting data to the unit resource.

(6)
The apparatus according to any one of (1) to (4), in which the processing unit initializes a buffer of a data length corresponding to the unit resource with the predetermined value, arranges the transmission data, and performs mapping from the buffer to the unit resource.

(7)
The apparatus according to any one of (1) to (6), in which the predetermined value is zero.

(8)
The apparatus according to any one of (1) to (7), in which a raised cosine (RC) filter, a root raised cosine (RRC) filter, or an isotropic orthogonal transfer algorithm (IOTA) filter is used for the filtering.

(9)
The apparatus according to any one of (1) to (8), in which the filtering is a process for generalized orthogonal frequency division multiplexing (OFDM).

(10)
An apparatus including:
a processing unit configured to acquire transmission data from data of a predetermined value and the transmission data in a signal filtered for every predetermined number of subcarriers, the data of the predetermined value being mapped to a subsymbol of an end portion in a time direction in a unit resource including one or more subcarriers and multiple subsymbols, the transmission data being mapped to another subsymbol in the unit resource.

(11)
A method including:
performing, by a processor, filtering on data of a predetermined value and transmission data for every predetermined number of subcarriers, the data of the predetermined value being mapped to a subsymbol of an end portion in a time direction in a unit resource including one or more subcarriers and multiple subsymbols, the transmission data being mapped to another subsymbol in the unit resource.

(12)
A program causing a computer to function as:
a processing unit configured to perform filtering on data of a predetermined value and transmission data for every predetermined number of subcarriers, the data of the predetermined value being mapped to a subsymbol of an end portion in a time direction in a unit resource including one or more subcarriers and multiple subsymbols, the transmission data being mapped to another subsymbol in the unit resource.

REFERENCE SIGNS LIST 1 system 1
100 base station
110 antenna unit
120 wireless communication unit
130 network communication unit
140 storage unit
150 processing unit
151 transmission processing unit
153 buffer control unit
200 terminal apparatus
210 antenna unit
220 wireless communication unit
230 storage unit
240 processing unit
241 reception processing unit
243 data acquisition unit

The invention claimed is:
1. An apparatus, comprising:
at least one processor configured to:
execute a filtering process on specific data of a specific value and transmission data;
variably set a ratio between a data length of the specific data and a data length of the transmission data to be mapped to a unit resource, wherein the ratio is set based on a number of a plurality of subcarriers of the unit resource and a size of the unit resource;

insert the specific data into the transmission data to obtain resulting data, wherein
  the resulting data is mapped to the unit resource,
  the unit resource includes a plurality of subsymbols and the plurality of subcarriers,
  the size of the unit resource is based on a number of the plurality of subsymbols and the number of the plurality of subcarriers,
  the filtering process is executed for each of the plurality of subcarriers,
  the specific data of the specific value is mapped to a first subsymbol of the plurality of subsymbols based on the set ratio,
  the first subsymbol is of an end portion of the unit resource in a time direction,
  the transmission data is mapped to a second subsymbol of the plurality of subsymbols in the unit resource based on the set ratio, and
  the second subsymbol is different from the first subsymbol of the end portion of the unit resource; and control transmission of a signal corresponding to the resulting data.

2. The apparatus according to claim 1, wherein the end portion of the unit resource includes:
  a first end portion of the unit resource in the time direction; and
  a second end portion of the unit resource in the time direction.

3. The apparatus according to claim 1, wherein the at least one processor is further configured to:
  control the data length of the specific data and the data length of the transmission data.

4. The apparatus according to claim 3, wherein the at least one processor is further configured to set the data length of the specific data equal to the number of the plurality of subcarriers of the unit resource.

5. The apparatus according to claim 1, wherein the at least one processor is further configured to:
  initialize a buffer with the specific value, wherein a data length of the buffer corresponds to a data length of the unit resource; and
  map buffer data from the buffer to the unit resource.

6. The apparatus according to claim 1, wherein the specific data, mapped to the first subsymbol of the end portion of the unit resource, has the specific value of zero.

7. The apparatus according to claim 1, wherein the at least one processor is further configured to execute the filtering process by utilization of one of a raised cosine (RC) filter, a root raised cosine (RRC) filter, or an isotropic orthogonal transfer algorithm (IOTA) filter.

8. The apparatus according to claim 1, wherein the filtering process is for generalized orthogonal frequency division multiplexing (OFDM).

9. The apparatus according to claim 1, wherein the specific data mapped to the first subsymbol of the end portion of the unit resource for the plurality of subcarriers is data of the same value.

10. The apparatus according to claim 1, wherein the specific data is mapped to the first subsymbol of the end portion of the unit resource to control continuity of an amplitude value between subsymbols of adjacent unit resources.

11. An apparatus, comprising:
at least one processor configured to acquire transmission data from a signal, wherein
  the signal includes specific data of a specific value and the transmission data,
  a ratio between a data length of the specific data and a data length of the transmission data mapped to a unit resource is variably set,
  the ratio is set based on a number of a plurality of subcarriers of the unit resource and a size of the unit resource,
  the specific data is inserted into the transmission data to obtain resulting data,
  the resulting data is mapped to the unit resource to obtain the signal,
  the unit resource includes a plurality of subsymbols and the plurality of subcarriers,
  the size of the unit resource is based on a number of the plurality of subsymbols and the number of the plurality of subcarriers,
  the signal is filtered for each of the plurality of subcarriers,
  the specific data is mapped to a first subsymbol of the plurality of subsymbols based on the set ratio,
  the first subsymbol is of an end portion of the unit resource in a time direction,
  the transmission data is mapped to a second subsymbol of the plurality of subsymbols in the unit resource based on the set ratio, and
  the second subsymbol is different from the first subsymbol of the end portion.

12. A method, comprising:
executing, by a processor, a filtering process on specific data of a specific value and transmission data;
variably setting, by the processor, a ratio between a data length of the specific data and a data length of the transmission data to be mapped to a unit resource, wherein the ratio is set based on a number of a plurality of subcarriers of the unit resource and a size of the unit resource;
inserting, by the processor, the specific data into the transmission data to obtain resulting data, wherein
  the resulting data is mapped to the unit resource,
  the unit resource includes a plurality of subsymbols and the plurality of subcarriers,
  the size of the unit resource is based on a number of the plurality of subsymbols and the number of the plurality of subcarriers,
  the filtering process is executed for each of the plurality of subcarriers,
  the specific data is mapped to a first subsymbol of the plurality of subsymbols based on the set ratio,
  the first subsymbol is of an end portion of the unit resource in a time direction,
  the transmission data is mapped to a second subsymbol of the plurality of subsymbols in the unit resource based on the set ratio, and
  the second subsymbol is different from the first subsymbol of the end portion; and
controlling, by the processor, transmission of a signal corresponding to the resulting data.

13. A non-transitory computer-readable medium having stored thereon, computer-executable instructions which, when executed by a processor of an information processing apparatus, cause the processor to execute operations, the operations comprising:

executing a filtering process on specific data of a specific value and transmission data;

variably setting, by the processor, a ratio between a data length of the specific data and a data length of the transmission data to be mapped to a unit resource, wherein the ratio is set based on a number of a plurality of subcarriers of the unit resource and a size of the unit resource;

inserting the specific data into the transmission data to obtain resulting data, wherein
- the resulting data is mapped to the unit resource,
- the unit resource includes a plurality of subsymbols and the plurality of subcarriers,
- the size of the unit resource is based on a number of the plurality of subsymbols and the number of the plurality of subcarriers,
- the filtering process is executed for each of the plurality of subcarriers,
- the specific data is mapped to a first subsymbol of the plurality of subsymbols based on the set ratio,
- the first subsymbol is of an end portion of the unit resource in a time direction,
- the transmission data is mapped to a second subsymbol of the plurality of subsymbols in the unit resource based on the set ratio, and
- the second subsymbol is different from the first subsymbol of the end portion; and controlling transmission of a signal corresponding to the resulting data.

* * * * *